United States Patent [19]
Iizuka et al.

[11] Patent Number: 6,021,000
[45] Date of Patent: Feb. 1, 2000

[54] BEAM SPLITTING DIFFRACTIVE OPTICAL ELEMENT

[75] Inventors: Takashi Iizuka; Masato Noguchi; Tsutomu Sato, all of Tokyo, Japan

[73] Assignee: Asahi Kogaku Kogyo Kabushiki Kaisha, Tokyo, Japan

[21] Appl. No.: 08/890,429

[22] Filed: Jul. 9, 1997

[30] Foreign Application Priority Data

Jul. 9, 1996 [JP] Japan .................................. 8-198271
Jul. 9, 1996 [JP] Japan .................................. 8-198272

[51] Int. Cl.⁷ .......................... G02B 5/18; G02B 27/10; G02B 27/44
[52] U.S. Cl. .......................... 359/574; 359/570; 359/569
[58] Field of Search .................... 359/574, 570, 359/569, 575, 572

[56] References Cited

U.S. PATENT DOCUMENTS 5,561,558 10/1996 Shiono et al. .................. 359/569
5,574,597 11/1996 Kataoka.

FOREIGN PATENT DOCUMENTS 61-2138021 9/1986 Japan ...................................... 359/574

OTHER PUBLICATIONS

Ehbets et al., Interferometric Fabrication of Modulated Submicrometer Gratings in Photoresist, 34 Applied Optics, No. 14, pp. 2540–2547 (May 10, 1995).

*Primary Examiner*—Jon Henry
*Attorney, Agent, or Firm*—Greenblum & Bernstein, P.L.C

[57] ABSTRACT

Disclosed is a diffractive optical element which includes a diffractive grating pattern on a base plate. The diffractive grating pattern includes a plurality of phase gratings arranged in parallel lines extending along a predetermined direction to cause diffraction of an incident beam. Each of the plurality of phase gratings has an asymmetrical phase pattern. There is a phase gap, $\Delta P$, representing a phase difference (in radians) between an end point and a beginning point of each phase pattern. The phase gap, $\Delta P$, is substantially equal for each of the plurality of phase gratings and satisfies the relationship $$0.7\pi < |\Delta P| < 1.2\pi.$$

13 Claims, 15 Drawing Sheets

BEAM SPLITTING DIFFRACTIVE OPTICAL ELEMENT

BACKGROUND OF THE INVENTION

The present invention relates to a beam splitting optical element which divides an incident beam into a plurality of number of emitted beams, and more particularly, to a beam splitting optical element using diffractive gratings.

Conventionally, beam splitters using diffractive gratings have been known. In such beam splitters, linear grooves or raised portions (i.e., gratings) are formed on, for example, a glass substrate. The arrangement of the gratings determines the pattern of emitted diffracted beams. Typically, the emitted beams (±1st order beams, ±2nd order beams, . . . ) are arranged symmetrically around a central beam (i.e., a zero order diffracted beam) and, as a result, there are an odd number of diffracted beams emitted.

A diffraction efficiency of the conventional diffractive gratings as described above is generally in a range of 70%–85%. There is a need for a beam splitter employing diffractive gratings which has a relatively high diffraction efficiency.

Further, in the field of digital opto-electronics, it is particularly useful if a diffractive optical element has an even number of emitted beams having relatively similar intensities. For example, in an optical recording device accessed by a computer or an optical computer, eight bits (a byte) is a unit when data is processed. If a beam is divided into an even and desired number of beams by the beam splitter, it is advantageous since the emitted beams are used for processing the data efficiently.

SUMMARY OF THE INVENTION

It is therefore an object of the present invention to provide an improved beam splitting optical element which divides an incident beam into an even number of beams and has a higher diffraction efficiency than a conventional element.

For the above object, according to one aspect of the invention, there is provided a diffractive optical element, comprising a cylindrical surface provided with a diffractive grating pattern. The diffractive grating pattern includes a plurality of phase gratings arranged in parallel lines extending along a circumference of the cylindrical surface to cause diffraction of an incident beam, where a beam incident on the diffractive grating pattern is emitted as divided into a plurality of diffracted beams. Since the grating pattern is formed on a cylindrical surface, and the garatings extend along the circumference of the cylindrical surface, a mold to be used for molding the grating pattern can be made easily with use of, for example, a lathe.

Preferably, a surface of the optical element from which the diffracted beams are emitted is also cylindrical having a curvature that is substantially the same as a curvature of the cylindrical surface, so that the phase diffracting element has a meniscus shape and has substantially no magnifying power in total. optionally, the plurality of phase gratings are of equal width in a direction of the generatrix of the cylinder and each of the plurality of phase gratings has a continuous, nonlinear surface to cause phase differences in a wave front of the incident beam. The mold for such a grating can be made relatively easily when the lathe is used.

Further optionally, each of the plurality of phase gratings has an asymmetrical phase pattern, and a phase gap $\Delta P$, representing a phase difference between an end point of each of the plurality of phase patterns and a beginning point of each of the plurality of phase patterns, in radians. The phase gap, $\Delta P$, is substantially equal for each of the plurality of phase gratings and satisfies:

$$0.7\pi < |\Delta P| < 1.2\pi.$$

With this structure, the emitted beams (i.e., the diffracted beams) distribute asymmetrically with respect to the zero order diffracted beam, and accordingly it is possible that the number of diffracted beams can be adusted to an even number.

Further optionally, the plurality of phase gratings are adjusted so that each of the divided diffracted beams have substantially the same intensity and no divided beam is emitted other than the intended number of beams. As a result, an even number of diffracted beams having substantially the same intensity may be emitted from the diffractive optical element.

According to another aspect of the invention, there is provided a diffractive optical element, comprising a base plate provided with a diffractive grating pattern. The diffractive grating pattern includes a plurality of phase gratings arranged in parallel lines extending along a predetermined direction of the base plate to cause diffraction of an incident beam. A beam incident on the diffractive grating pattern is emitted as a plurality of diffracted beams, wherein each of the plurality of phase gratings has an asymmetrical phase pattern in a direction where the plurality of phase gratings are arranged. A phase gap $\Delta P$, representing a phase difference between an end point of each of the plurality of phase patterns and a beginning point of each of the plurality of phase patterns, in radians, is substantially equal for each of the plurality of phase gratings and satisfies:

$$0.7\pi < |\Delta P| < 1.2\pi.$$

With this optical element, a desired even number of diffracted beams, which are asymmetrically distribued with respect to the zero order beam, are obtained.

It shold be noted that the diffracted beams substantially consist of a desired number of beams.

Various examples are indicated as embodiments. In each embodiment, a predetermined error in the phase pattern is permissible.

Specifically, the predetermined permissible error in the phase difference may be less than 2%.

According to a further aspect of the invention, there is provided a diffractive optical element, comprising: a base plate having a cylindrical surface; and a diffractive grating pattern engraved on the cylindrical surface in a direction perpendicular to a generatrix of the cylindrical surface so that diffracted beams distribute in a dimension along the generatrix.

Since the diffractive grating pattern is formed on the cylindrical surface, a mold to be used for molding the optical element can be produced relatively easily.

Optionally, the grating pattern includes a plurality of phase gratings. Due to the shape of the optical element, and therefore the shape of the mold for the optical element, a complicated pattern can be employed. Accordingly, the grating can be a phase grating. When employing the phase grating, diffraction efficiency is improved.

Optionally or alternatively, each of the phase gratings has an asymmetrical phase pattern. As a result, the diffracted beams distribute asymmetrically with respect to a zero order diffracted beam.

Accordingly, by selecting an appropriate phase pattern of the phase gratings, an even number of diffracted beams can be emitted.

According to a further aspect of the invention, there is provided a method for producing a diffracting optical element, comprising: making a mold by (1) rotating a cylindrical metal mold about a rotation axis, and (2) moving a cutting tool to a predetermined radial distance from the rotation axis and moving the tool along the rotation axis; and applying an injection mold process with use of a master made by the steps of making the mold to make the diffracting optical element.

With this method, a complicated phase pattern can be formed on the mold.

According to a further aspect of the invention, there is provided a method for producing a mold to be used for making a diffracting optical element having a cylindrical surface with an injection mold process, comprising (1) rotating a cylindrical metal mold about a rotation axis, and (2) moving a cutting tool to a predetermined radial distance from the rotation axis and moving the tool along the rotation axis. Also with this method, a complicated pattern extending along a circumference of the mold can be formed on the circumferential surface of the mold.

DETAILED DESCRIPTION OF THE PREFERRED EMBODIMENTS

Figure 2:
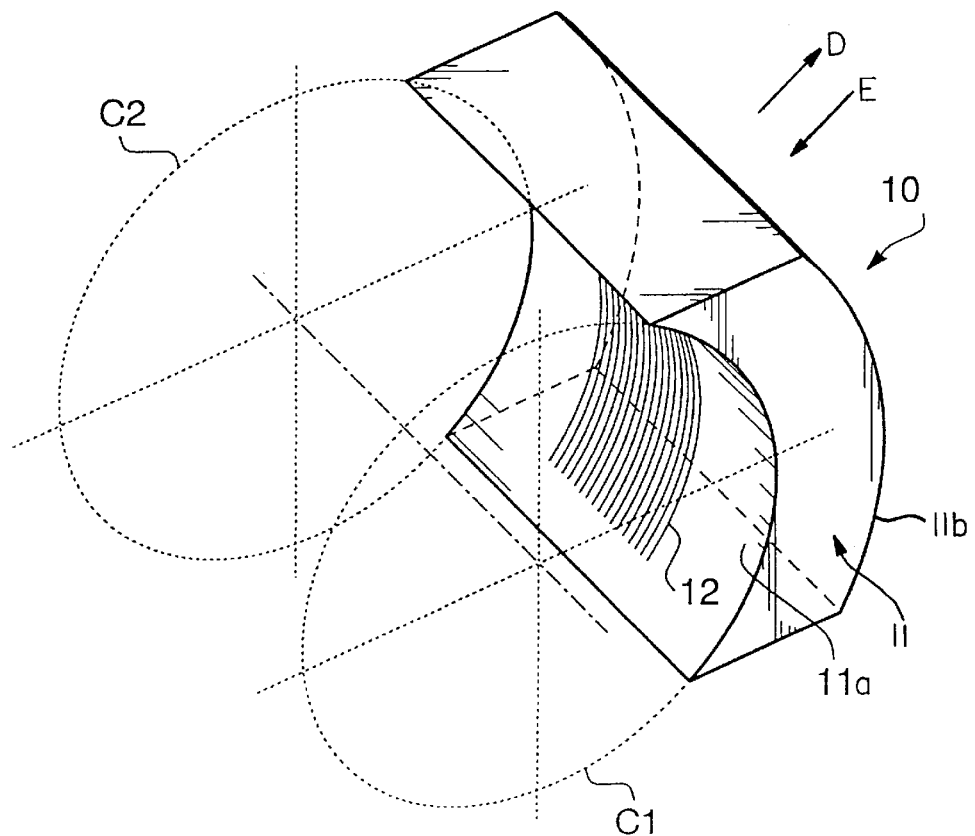
FIG. 2 is a perspective view of the beam splitter according to an embodiment of the invention.

FIG. 2 is a perspective view of a beam splitter 10 according to an embodiment of the invention. The beam splitter 10 includes a base 11 on which a grating pattern 12 is formed. As shown in FIG. 2, the base 11 has a concave surface 11a and a convex surface 11b and is represented as a portion of a wall of a cylinder. In FIG. 2, dotted lines show an imaginary cylinder with ends C1 and C2 having equal diameters representing a diameter of the concave surface 11a. The grating pattern 12 is formed on the concave surface 11a.

Figure 1:
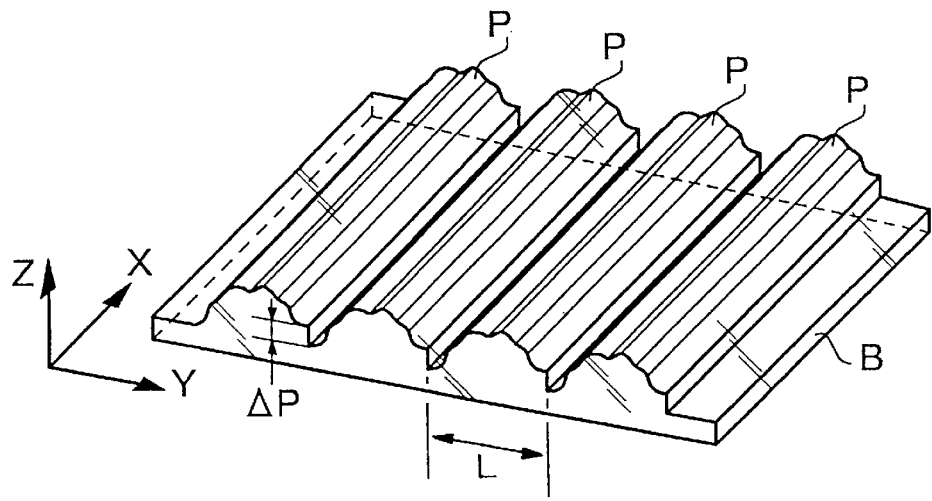
FIG. 1 is a schematic enlarged perspective view of gratings formed on a beam splitter according to an embodiment of the invention.

FIG. 1 is a schematic enlarged view of the grating pattern 12. it should be noted that in FIG. 1, the grating pattern 12 is shown as formed on a flat surface, and description with reference to FIG. 1 is made as if the grating pattern 12 is formed on the flat surface. As described above, however, the grating pattern 12 is actually formed on the concave surface 11a.

The grating pattern 12 is formed having a plurality of identically formed phase gratings P extending linearly. Each of the phase gratings P have a predetermined length L along a y-axis direction and linearly extend in an x-axis direction. In particular, the phase gratings shown in FIG. 1 correspond to a particular numerical example (example 3) described in more detail below. Note that the y-axis direction is a direction parallel to a generatrix of the base 11 (i.e., the imaginary cylinder defined by the end circles C1 and C2) and the x-axis direction represents the curve of the concave surface 11a.

The grating pattern 12 and the base 11 are made of, for example, glass or a transparent resinous material. The grating pattern 12 is formed so that it divides an incident beam into a plurality of diffracted emitted beams. It should be noted that the grating pattern can be formed on a flat surface. Practically, however, due to difficulty in producing a complicated grating pattern as described below, it is preferable, to employ a cylindrical surface as a surface on which the grating pattern 12 is formed. Further, if the cylindrical surface is employed, it may be advantageous to use resinous material for the optical element, and the optical element may be formed with a molding process.

As shown in FIG. 1, a cross section along a Y-Z plane of each grating P has a shape which causes non-linear beams to pass therethrough along directions represented by the arrows D, E in FIG. 2. In other words, lines representative of the phase difference caused by the beam splitter 10 is similar to the cross-sectional shape of the phase gratings P. If the phase difference caused by the grating is represented by $\delta$ with respect to the lowermost portion of the surface of the phase grating P, the surface of the phase grating P is defined by a non-linear phase difference $\delta$ which varies along the y-axis direction. In other words, the phase difference $\delta$ is defined as a difference between a point on a phase grating P and a predetermined reference point on the phase grating P. In the embodiments, the predetermined reference point is determined and meets with an adjacent phase grating P with a phase gap $\Delta P$. In particular, the phase gap $\Delta P$ should be constant for all phase gratings P and should satisfy the condition:

$$0.7\pi < |\Delta P| < 1.2\pi.$$

According to the beam splitter 10 of the embodiment, the cross-section along the y-axis phase gratings P have an asymmetrical shape (i.e., an asymmetrical phase distribution), and the diffracted beams are also asymmetrical with respect to a zero order diffracted beam and the incident beam is divided into an even number of emitted beams.

A method of forming the beam splitter 10 is now described. Since the cross-sectional shape of the phase patterns P is nonlinear and complicated, it is difficult to form a mold for the grating pattern 12 using an etching process. Accordingly, the diffractive optical element 10 is molded using a metal mold. However, if the surface on which a master pattern is formed is a flat surface, a cutting tool for forming the pattern is to be moved three dimensionally, i.e., in the x, y and z axis directions relative to the surface. Considering the size of the gratings, it may be very difficult to control the movement of the cutting tool to form the pattern precisely.

Figure 3:
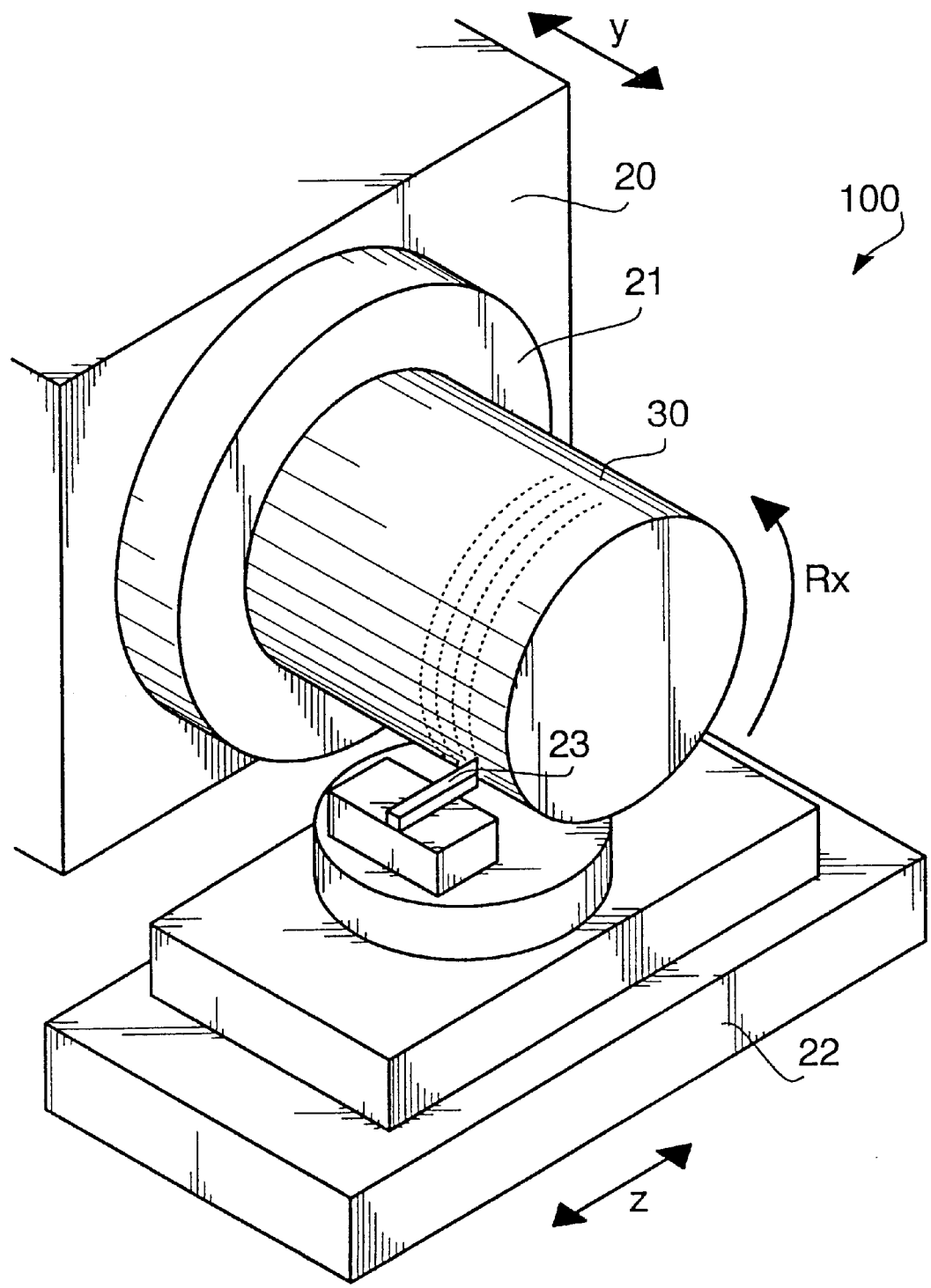
FIG. 3 is a perspective view illustrating a process for making a mold for the beam splitter of FIG. 2.
Figure 4:
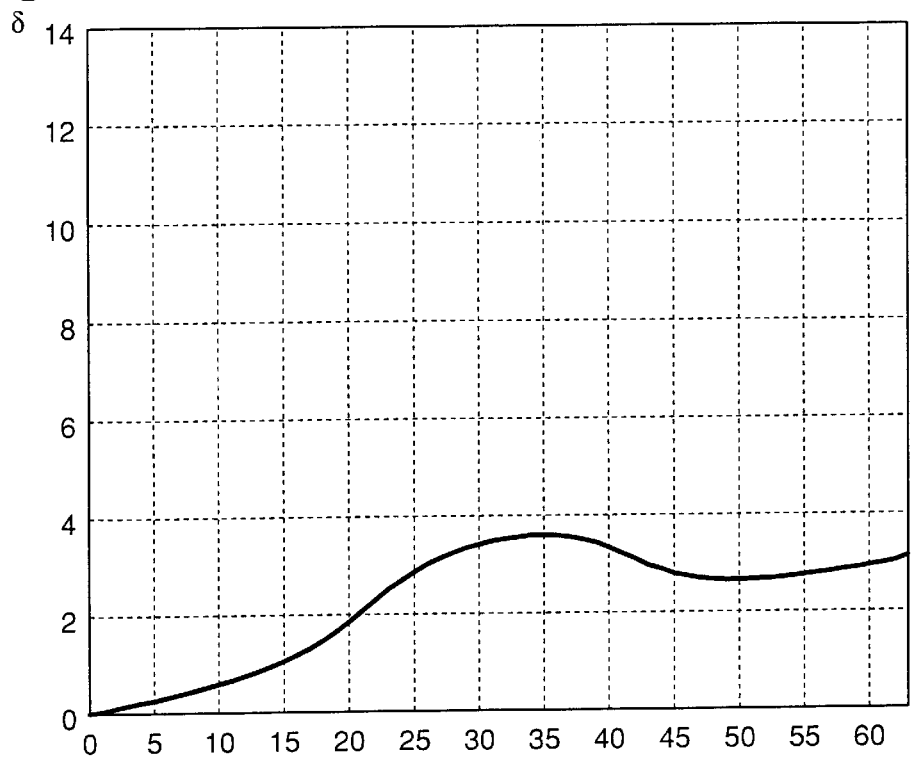
FIGS. 4 through 15 are graphs illustrating exemplary phase patterns for the beam splitter of FIG. 2.
Figure 5:
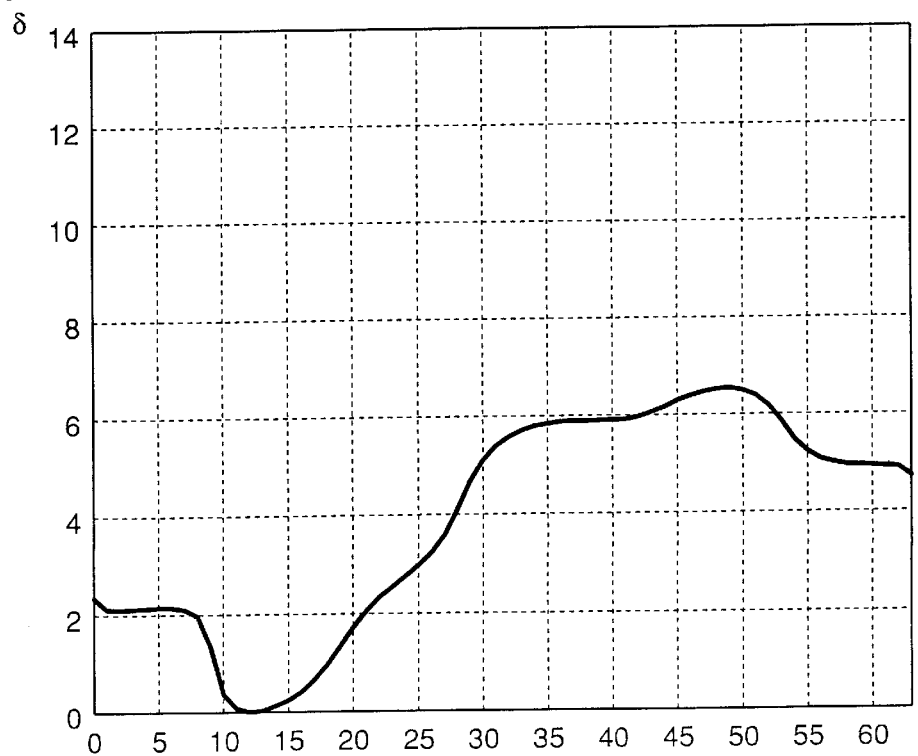
Figure 6:
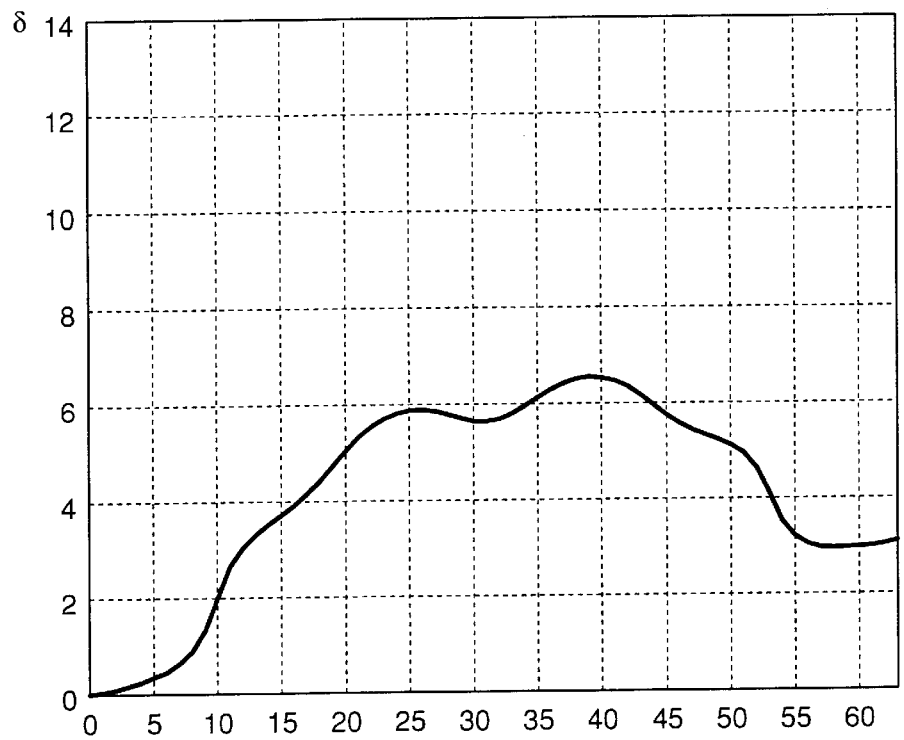
Figure 7:
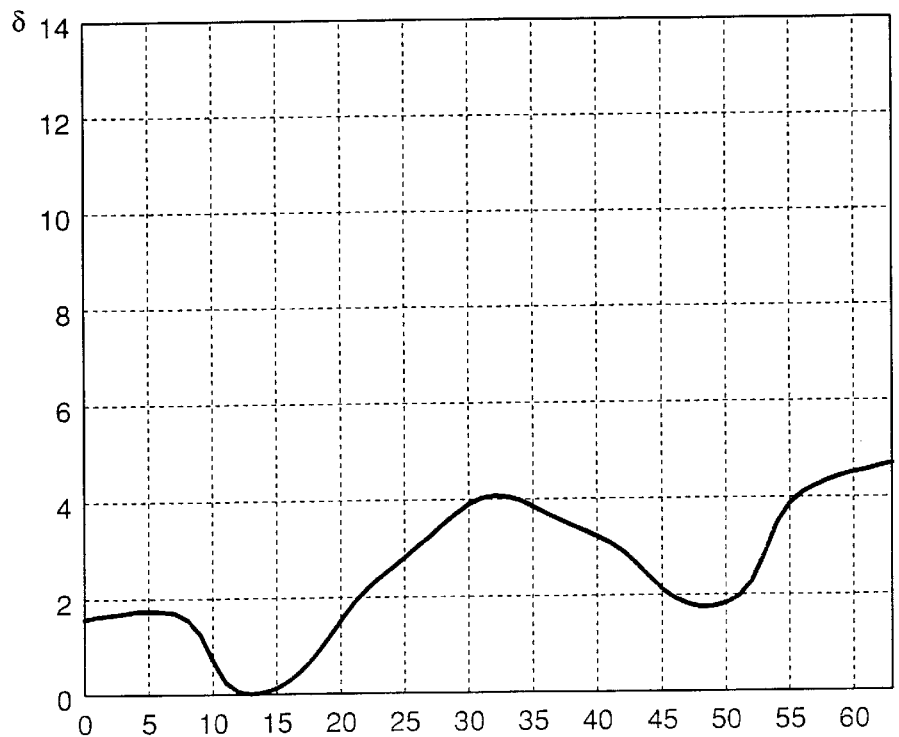
Figure 8:
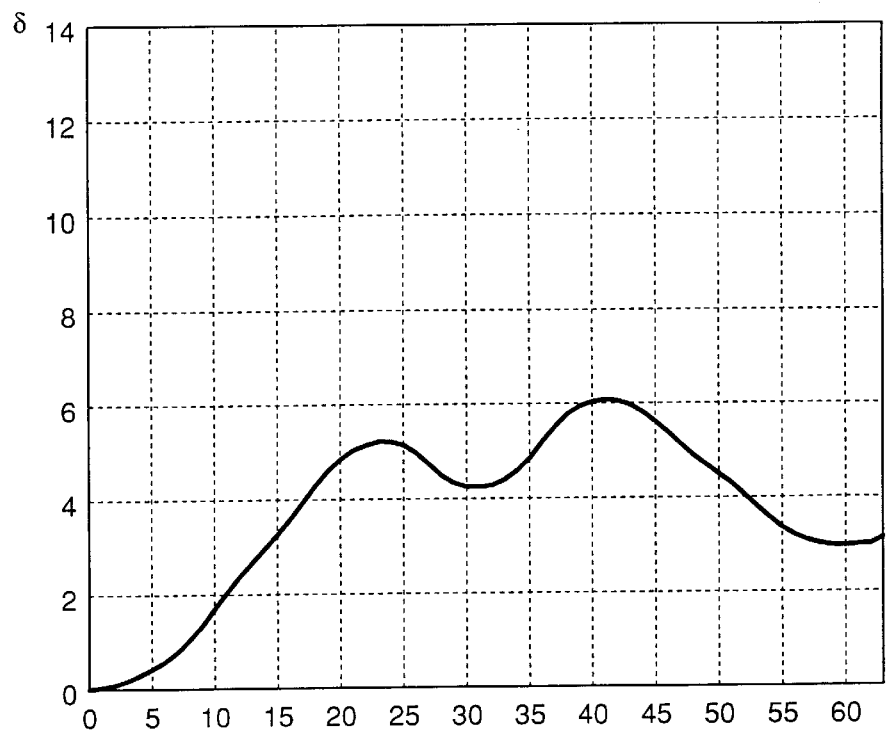
Figure 9:
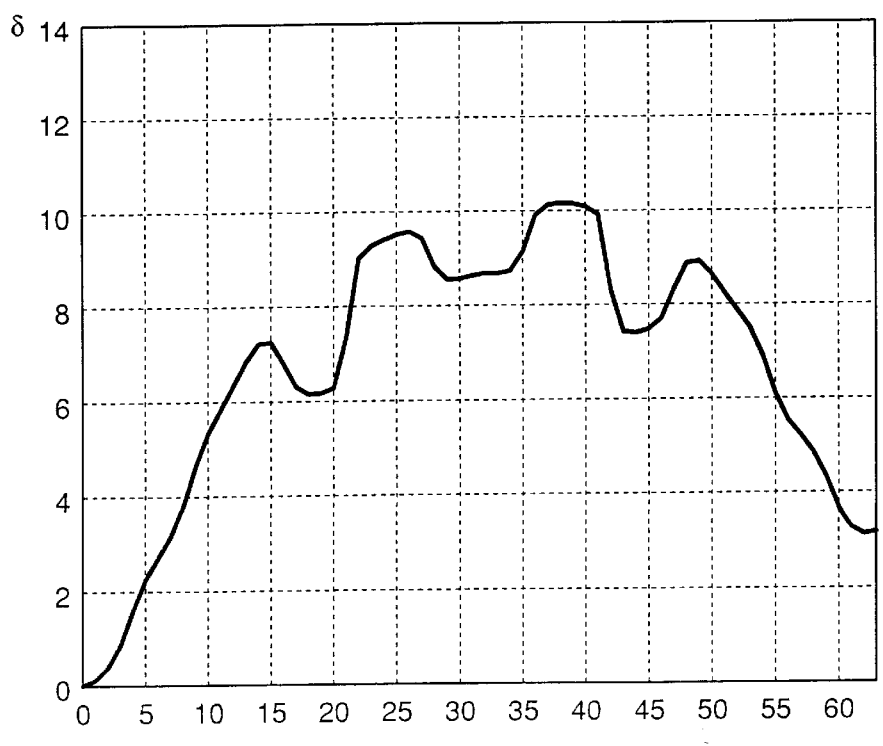
Figure 10:
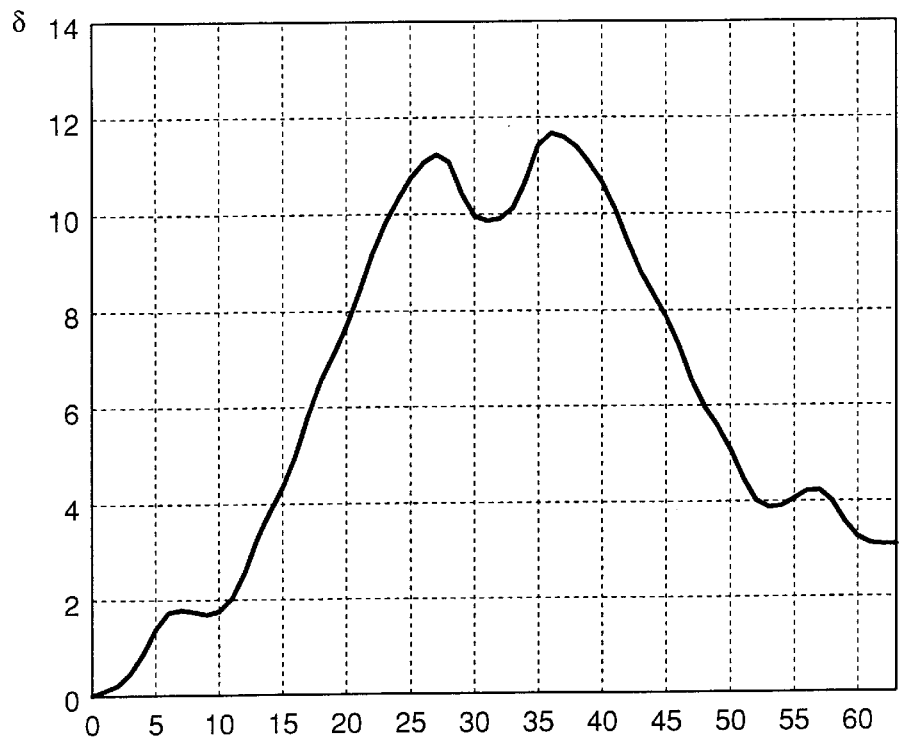
Figure 11:
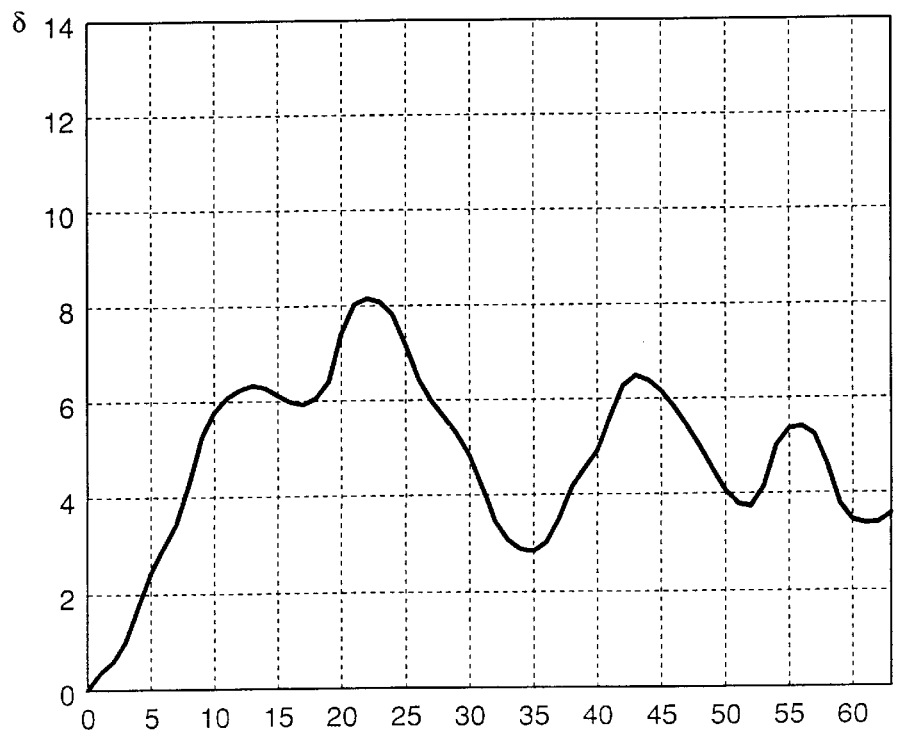
Figure 12:
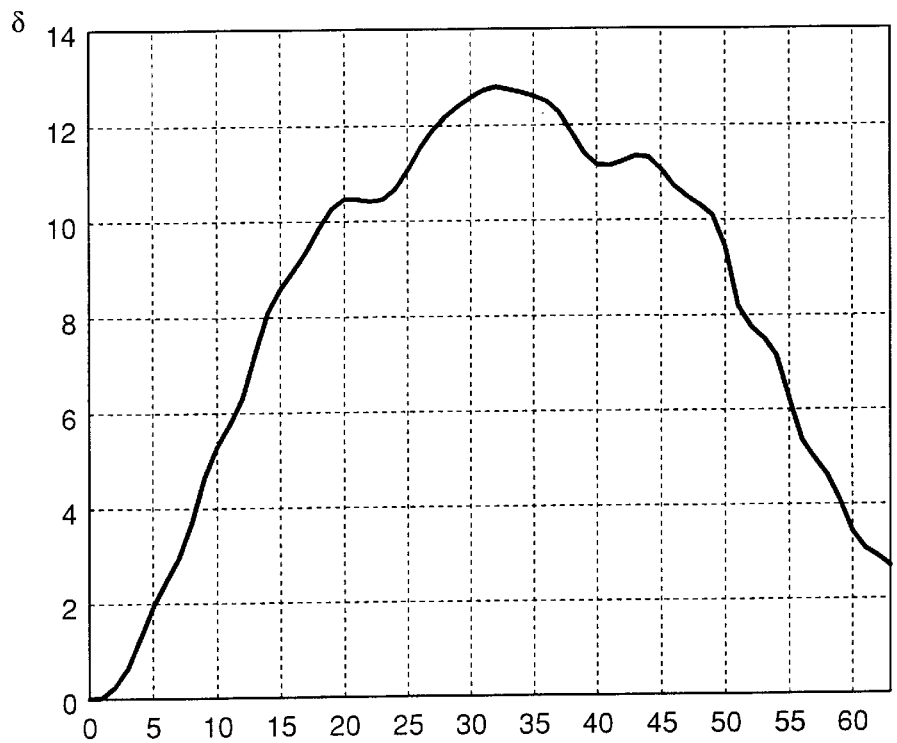
Figure 13:
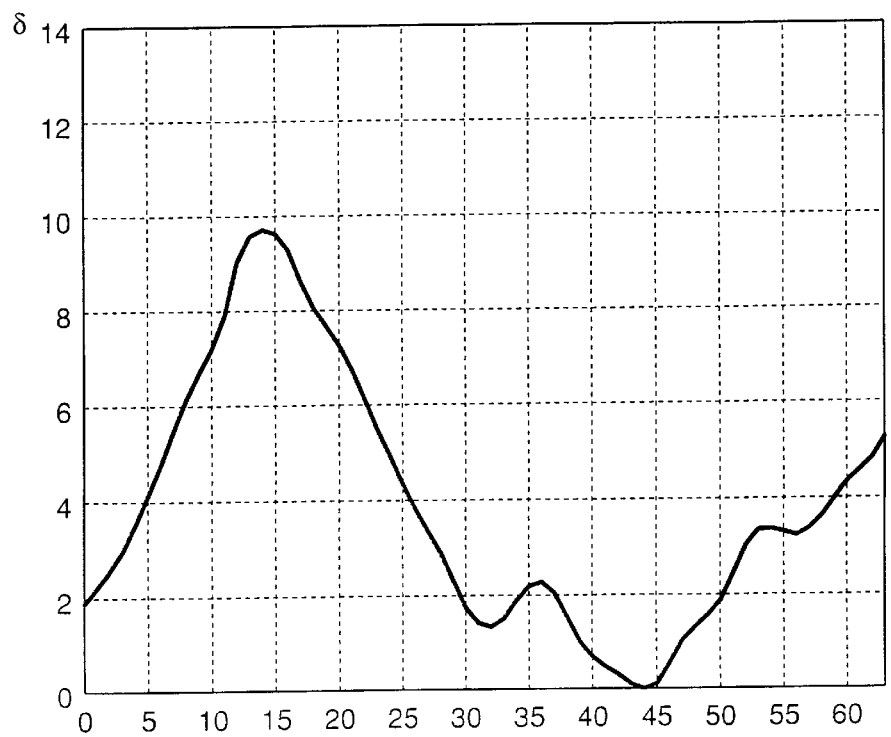
Figure 14:
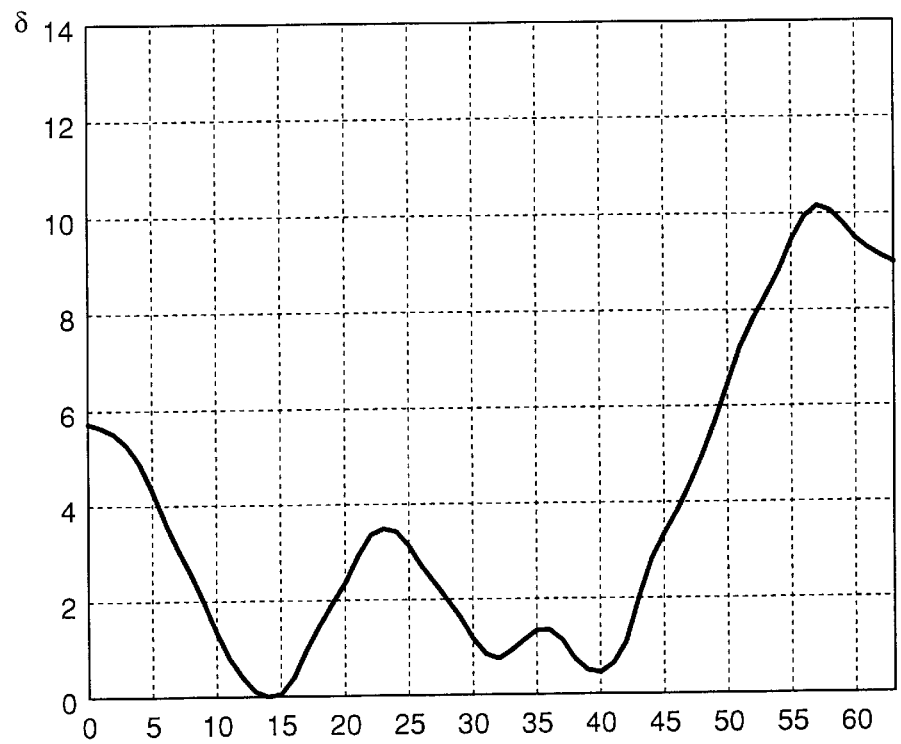
Figure 15:
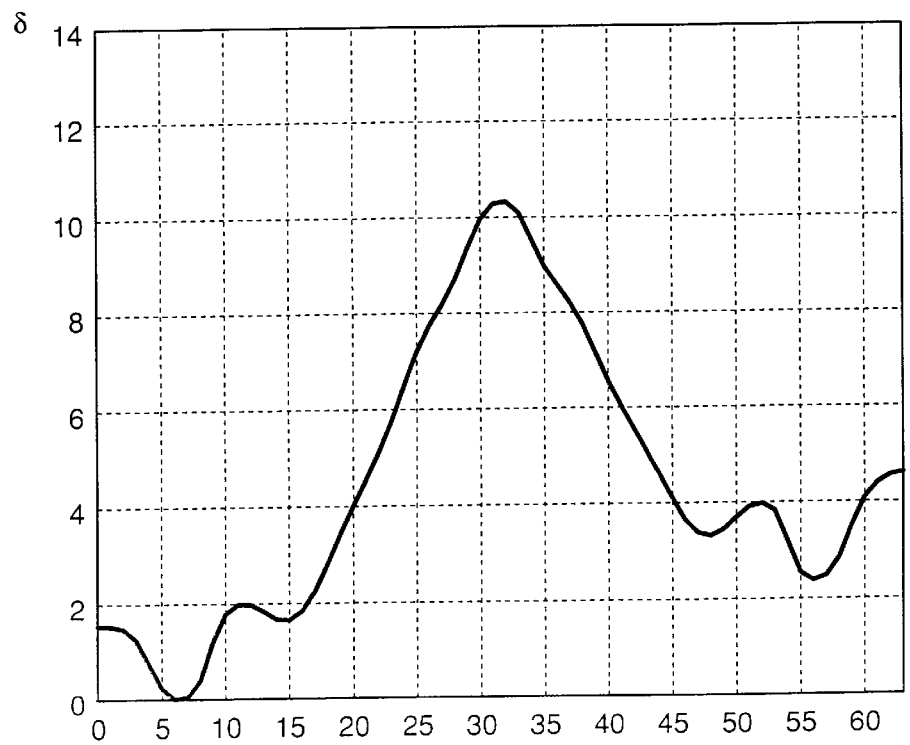
Figure 16:
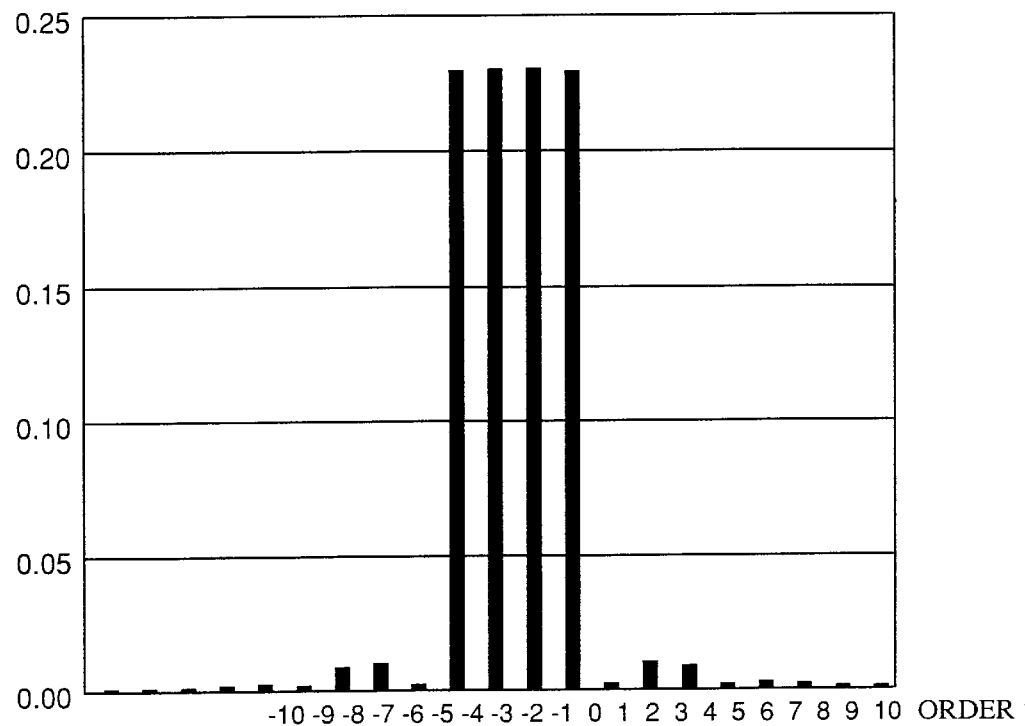
FIGS. 16 through 27 are graphs showing a distribution of intensities of the diffracted beams corresponding to the exemplary phase patterns of FIGS. 4 through 15.
Figure 17:
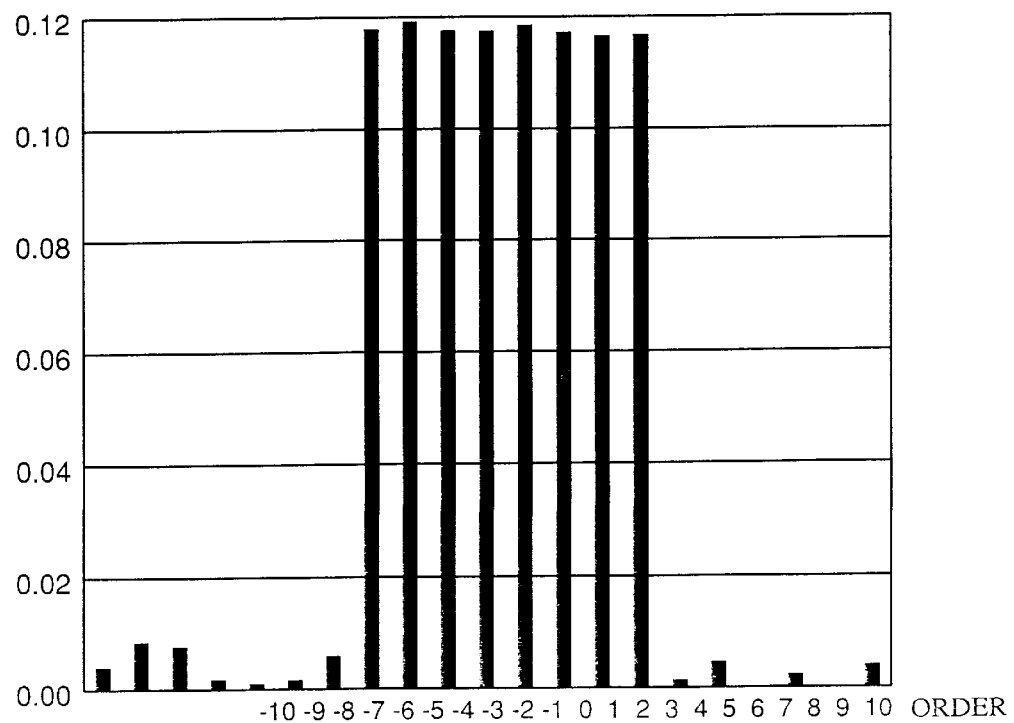
Figure 18:
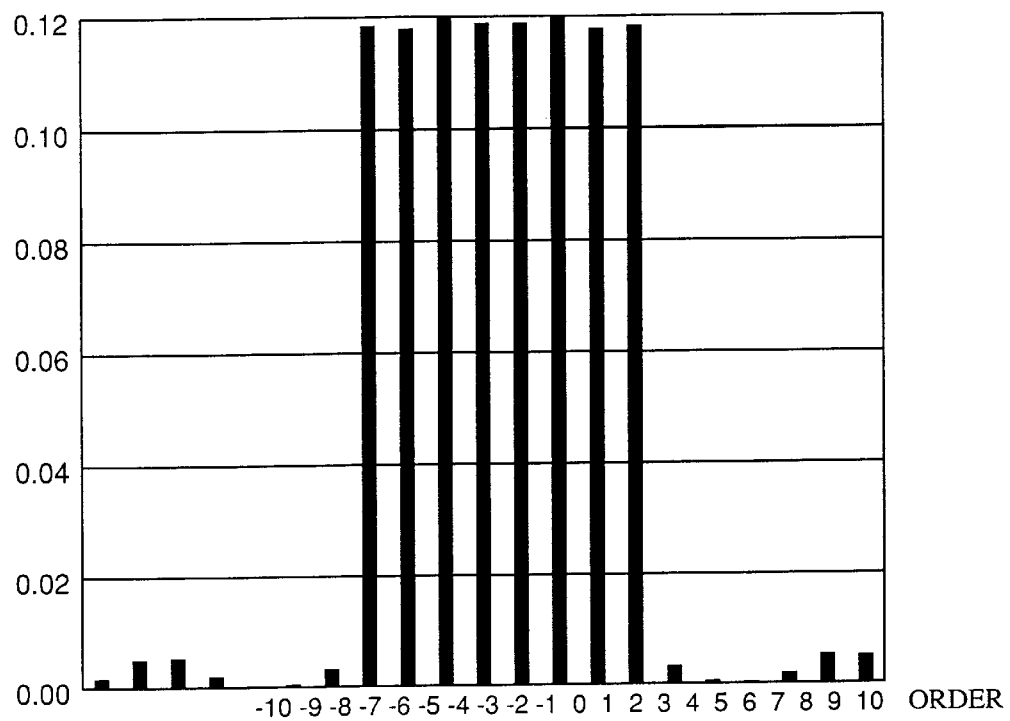
Figure 19:
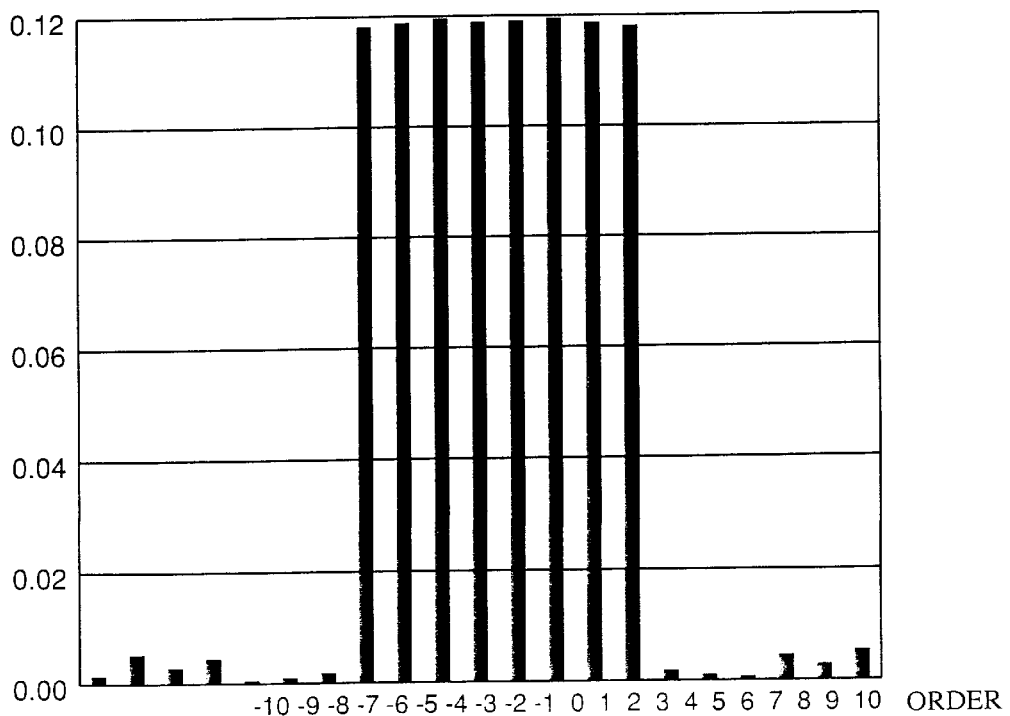
Figure 20:
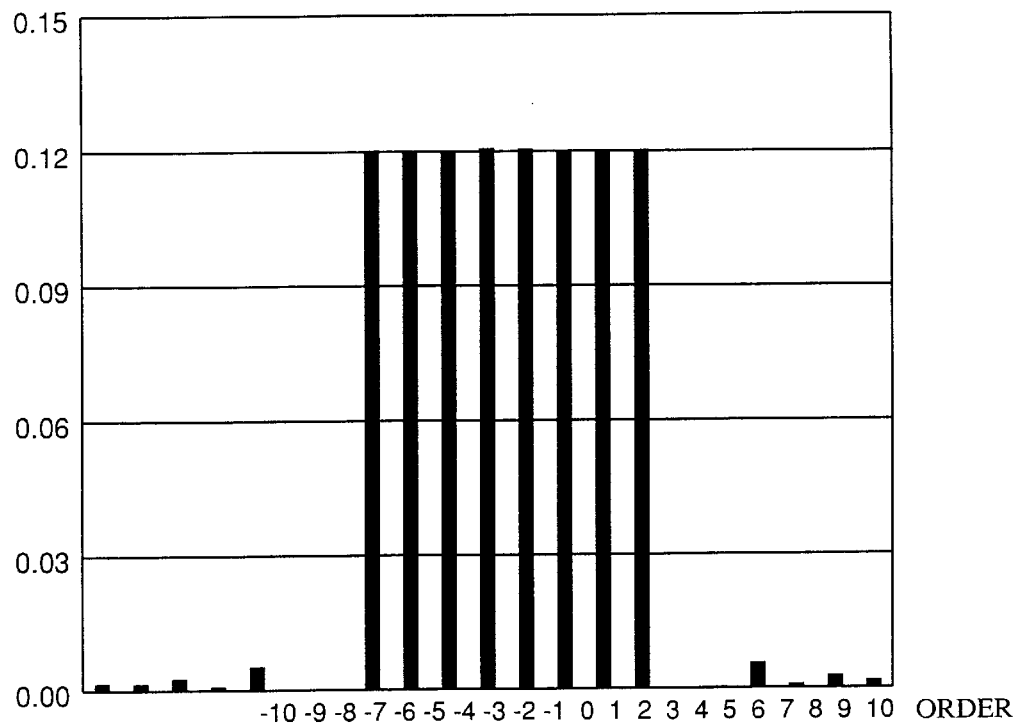
Figure 21:
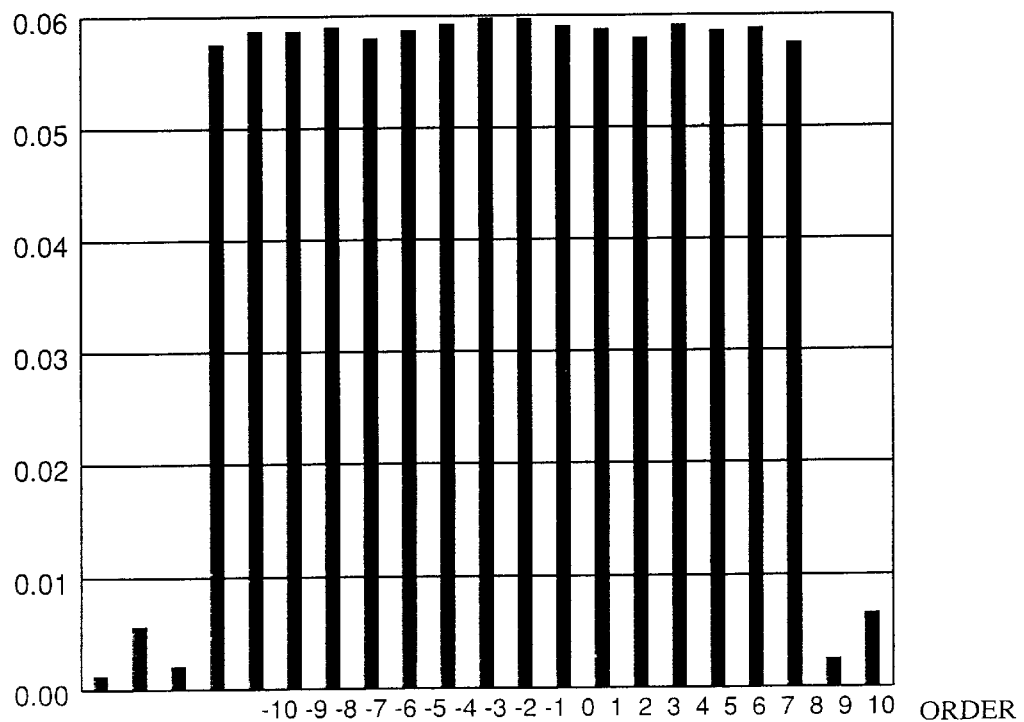
Figure 22:
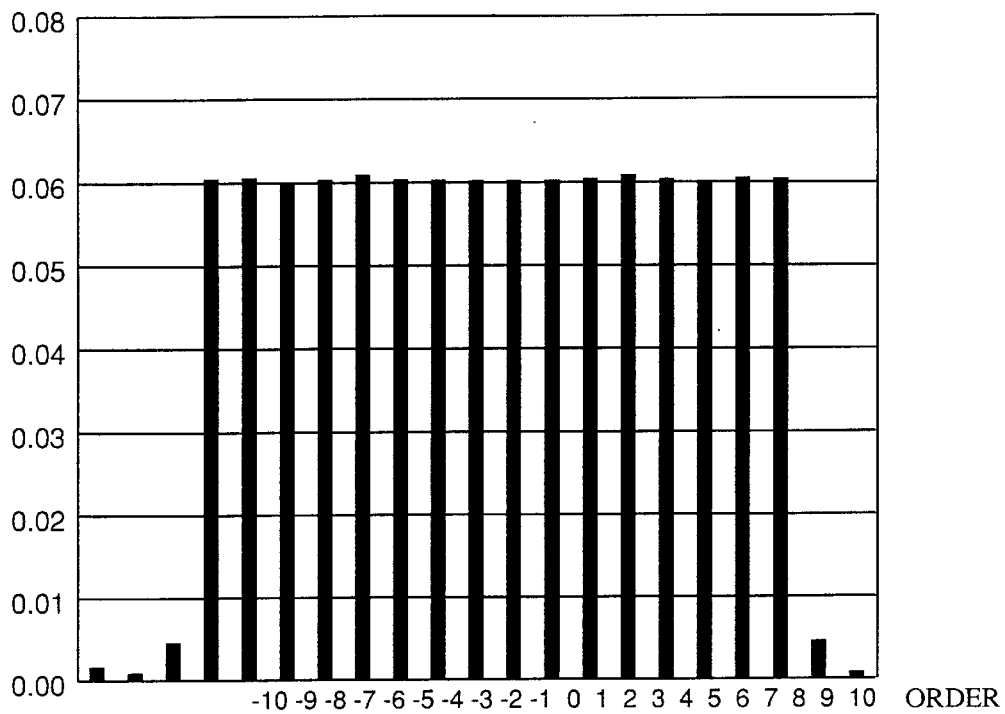
Figure 23:
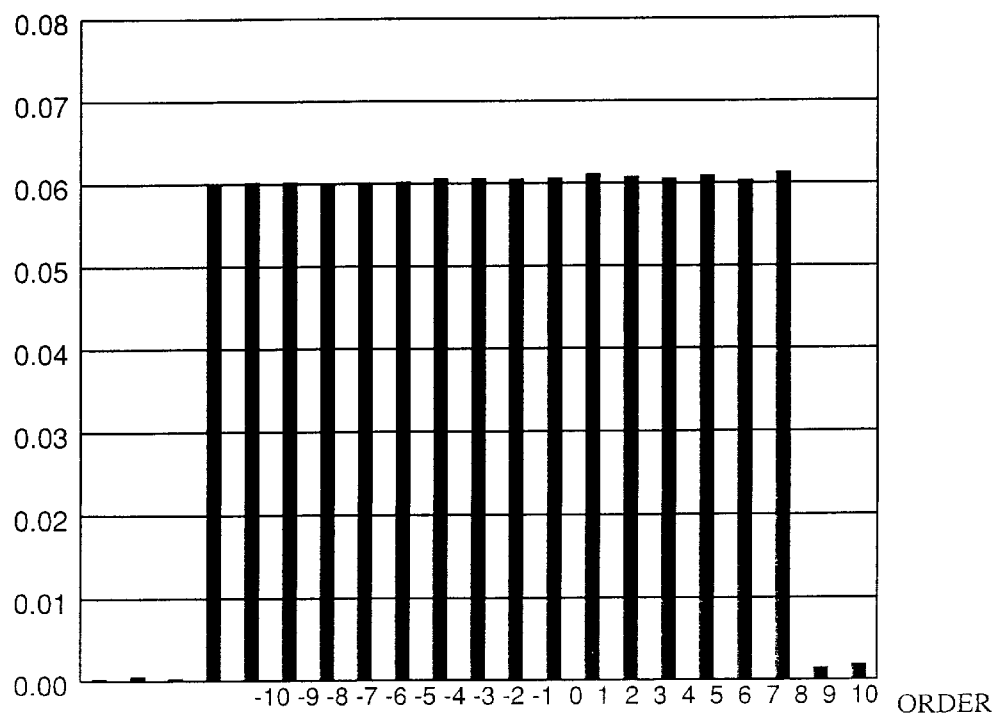
Figure 24:
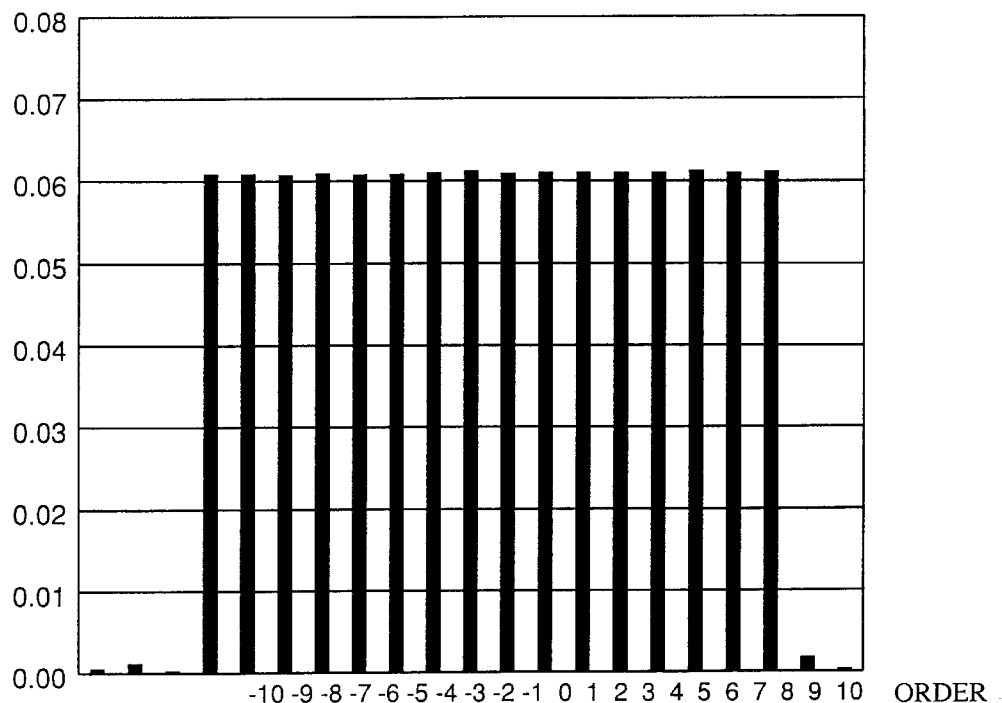
Figure 25:
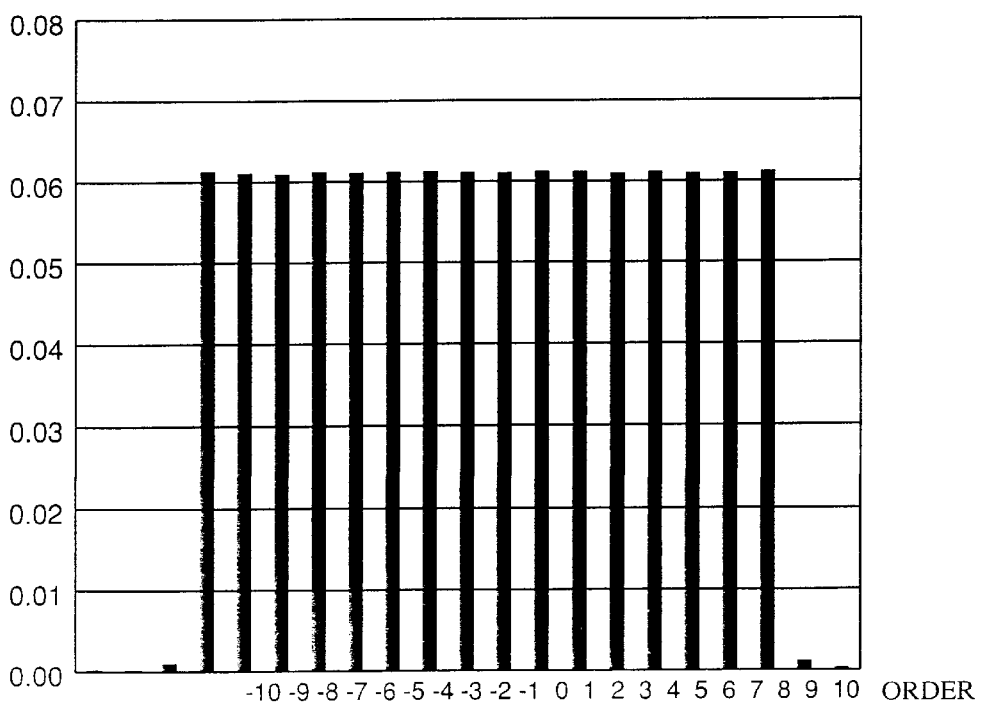
Figure 26:
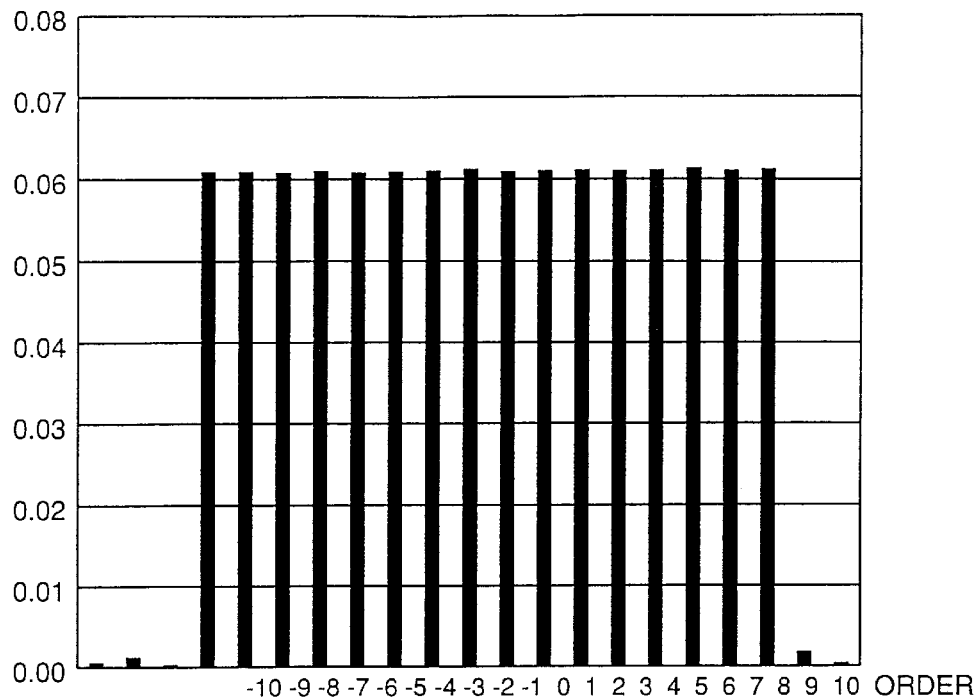
Figure 27:
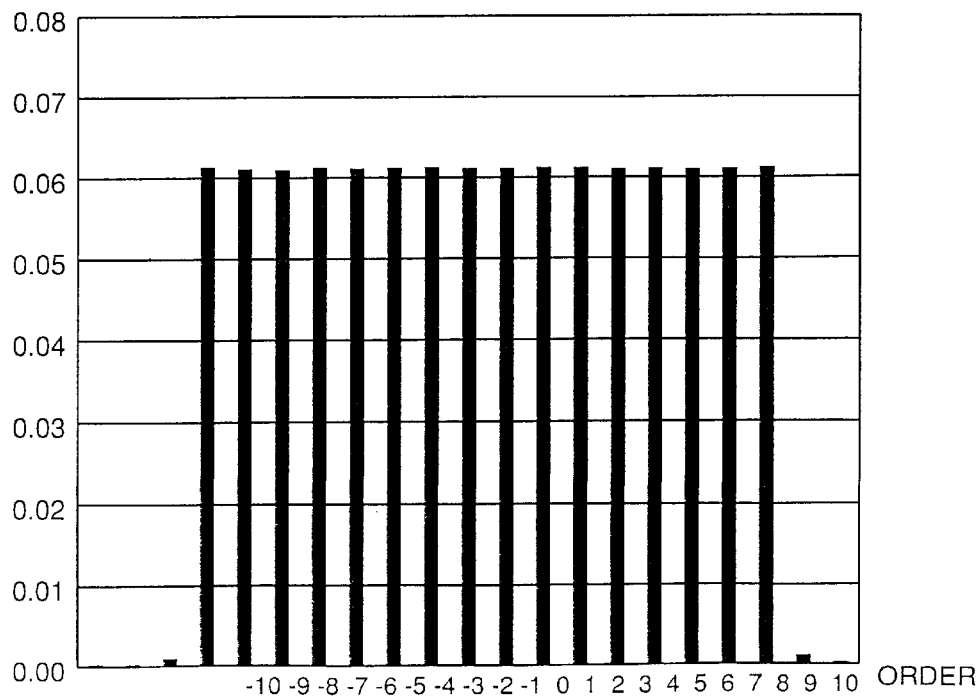

FIG. 3 is a perspective view illustrating a process for making a mold 30 for the beam splitter 10. Since each of the gratings has a surface which cannot be made with use of an etching or the like, the mold 30 should be used in order to make the phase gratings. The mold 30 is a cylindrical member as shown in FIG. 2, and the pattern 31, representing the grating pattern 12, is formed on the circumferential surface of the mold 30 using a cutting tool 100. The mold 30 is then used to form the beam splitter 10. When the beam splitter 10 is made, for example, a well-known injection mold method is applied using the mold 30 as a master. It should be noted that the beam splitter 10 is formed of optical plastic such as PMMA (Plymethyl methacrylate).

In this embodiment, as shown in FIG. 2, since the phase difference 6 of each phase pattern P is constant along the x-axis direction, the positional relation between the mold 30 and the cutting tool 100 need only be adjusted in two dimensions (i.e., the y-axis direction and the z-axis direction). Thus, the phase patterns P can be engraved accurately in a short time and at a low cost.

As shown in FIG. 3, the cutting tool 100 includes a lathe 20, a support 21 rotated by the lathe 20 and movable along a rotation axis thereof (i.e., movable in a y-axis direction), a sliding table 22 arranged to move perpendicular to the rotation axis of the support 21 (i.e., in a z-axis direction), and a tool 23 fixedly provided on the sliding table 22.

The metal mold 30 is fixed coaxially with the support 21 and is rotated in a direction Rx (corresponding to the x-axis direction of FIG. 1). Then, by appropriate movement of the support 21 along the y-axis direction and of the sliding table 22 along the z-axis direction with the metal mold 30 rotated, the mold 30 for the phase gratings P is formed.

The mold formed 30 is then used to from the beam splitter 10.

Twelve particular numerical examples of the phase grating P are now described with reference to FIGS. 4 through 27.

In example 1, the phase grating P is formed such that an incident beam is divided into 4 emitted beams by the beam splitter 10, in examples 2–5, the phase grating P is formed such that an incident, beam is divided into 8 emitted beams, and in examples 6–12, the phase grating P is formed such that an incident beam is divided into 16 emitted beams by the beam splitter 10.

In these examples, the phase grating P is designed such that: (1) intensities of each emitted beam are substantially the same, and (2) only the intended number of emitted beams are emitted.

In the following description, the width L (i.e., the length of in the Y-axis direction) of each phase grating P is divided into 64 co-ordinates (designated 0–63). A reference point is designated as a point at which the phase pattern P is lowest in relation to the concave surface 11a. Further, the phase difference δ for each co-ordinate is given in radians. Accordingly, the phase difference δ is more than 0. However, a height H along the z-axis direction (i.e., an actual height of the phase grating) in micrometers ($\mu$m) may be calculated, for a predetermined incident beam, using the formula:

$$H = \delta \times \lambda / (2\pi(n-1)),$$

where n is a refractive index of the material of the beam splitter 10 and λ is a wavelength of the incident beam. It is assumed that the beam splitter 10 is located within air whose refractive index is regarded as 1.

EXAMPLE 1

Table 1 shows data for a pattern of the phase grating P according to example 1. The data is shown graphically in FIG. 4 where a vertical axis is the phase difference δ and a horizontal axis is the coordinate along the y-axis direction. In examples 1, the phase gap ΔP is 1.00π. Note that, the phase gap ΔP is defined a difference between the phases at the coordinate 0 and the coordinate 63.

TABLE 1

ΔP = 1.00 π

| Coord. | δ | Coord. | δ | Coord. | δ |
|---|---|---|---|---|---|
| 0 | 0.00000 | 22 | 2.28947 | 44 | 2.89397 |
| 1 | 0.04000 | 23 | 2.51947 | 45 | 2.79397 |
| 2 | 0.10042 | 24 | 2.69518 | 46 | 2.74279 |
| 3 | 0.16042 | 25 | 2.86518 | 47 | 2.69279 |
| 4 | 0.21520 | 26 | 3.02656 | 48 | 2.67291 |
| 5 | 0.25520 | 27 | 3.14656 | 49 | 2.65291 |
| 6 | 0.32315 | 28 | 3.25191 | 50 | 2.66056 |
| 7 | 0.38315 | 29 | 3.35191 | 51 | 2.67056 |
| 8 | 0.44920 | 30 | 3.41679 | 52 | 2.67518 |
| 9 | 0.51920 | 31 | 3.48679 | 53 | 2.69518 |
| 10 | 0.59142 | 32 | 3.52997 | 54 | 2.72447 |
| 11 | 0.66142 | 33 | 3.55997 | 55 | 2.75447 |
| 12 | 0.75100 | 34 | 3.59951 | 56 | 2.79033 |
| 13 | 0.84100 | 35 | 3.59951 | 57 | 2.82033 |
| 14 | 0.94020 | 36 | 3.58770 | 58 | 2.86386 |
| 15 | 1.05020 | 37 | 3.55770 | 59 | 2.89386 |
| 16 | 1.17834 | 38 | 3.50415 | 60 | 2.94434 |
| 17 | 1.30834 | 39 | 3.44415 | 61 | 2.98434 |
| 18 | 1.46586 | 40 | 3.33870 | 62 | 3.03420 |
| 19 | 1.64586 | 41 | 3.21870 | 63 | 3.13420 |
| 20 | 1.84933 | 42 | 3.10951 | | |
| 21 | 2.06933 | 43 | 2.96951 | | |

EXAMPLE 2

Table 2 shows data for a pattern of the phase grating P according to example 2. The data is shown graphically in FIG. 5. In example 2, the phase gap ΔP is 0.75π.

TABLE 2

ΔP = 0.75

| Coord. | δ | Coord. | δ | Coord. | δ |
|---|---|---|---|---|---|
| 0 | 2.34750 | 22 | 2.33100 | 44 | 6.16100 |
| 1 | 2.11350 | 23 | 2.54700 | 45 | 6.29850 |
| 2 | 2.10350 | 24 | 2.76700 | 46 | 6.38850 |
| 3 | 2.11700 | 25 | 2.98600 | 47 | 6.46600 |
| 4 | 2.13200 | 26 | 3.23600 | 48 | 6.51600 |
| 5 | 2.14700 | 27 | 3.57850 | 49 | 6.53700 |
| 6 | 2.14700 | 28 | 4.10850 | 50 | 6.48700 |
| 7 | 2.10350 | 29 | 4.68100 | 51 | 6.38100 |
| 8 | 1.96350 | 30 | 5.10100 | 52 | 6.17100 |
| 9 | 1.32750 | 31 | 5.39450 | 53 | 5.85000 |
| 10 | 0.36750 | 32 | 5.57450 | 54 | 5.47000 |
| 11 | 0.07000 | 33 | 5.70650 | 55 | 5.22600 |
| 12 | 0.00000 | 34 | 5.79650 | 56 | 5.06600 |
| 13 | 0.02550 | 35 | 5.84250 | 57 | 4.99800 |
| 14 | 0.12550 | 36 | 5.88250 | 58 | 4.94800 |
| 15 | 0.23800 | 37 | 5.89250 | 59 | 4.93550 |
| 16 | 0.40800 | 38 | 5.89250 | 60 | 4.92550 |
| 17 | 0.65600 | 39 | 5.89650 | 61 | 4.91000 |
| 18 | 0.96600 | 40 | 5.90650 | 62 | 4.89000 |
| 19 | 1.34000 | 41 | 5.91450 | 63 | 4.70250 |
| 20 | 1.72000 | 42 | 5.96450 | | |
| 21 | 2.05100 | 43 | 6.06100 | | |

EXAMPLE 3

Table 3 shows data for a pattern of the phase grating P according to example 3. The data is shown graphically in FIG. 6. In example 3, the phase gap ΔP is 0.99π.

TABLE 3

$\Delta P = 0.99\ \pi$

| Coord. | δ | Coord. | δ | Coord. | δ |
|---|---|---|---|---|---|
| 0 | 0.00000 | 22 | 5.53800 | 44 | 5.95500 |
| 1 | 0.04000 | 23 | 5.69800 | 45 | 5.74500 |
| 2 | 0.08700 | 24 | 5.81200 | 46 | 5.57400 |
| 3 | 0.16700 | 25 | 5.87200 | 47 | 5.43400 |
| 4 | 0.24600 | 26 | 5.88400 | 48 | 5.33000 |
| 5 | 0.35600 | 27 | 5.85400 | 49 | 5.23000 |
| 6 | 0.45900 | 28 | 5.78500 | 50 | 5.11400 |
| 7 | 0.63900 | 29 | 5.70500 | 51 | 4.94400 |
| 8 | 0.88800 | 30 | 5.63700 | 52 | 4.63400 |
| 9 | 1.31800 | 31 | 5.63700 | 53 | 4.11400 |
| 10 | 1.99700 | 32 | 5.67800 | 54 | 3.52200 |
| 11 | 2.65700 | 33 | 5.79800 | 55 | 3.20200 |
| 12 | 3.03300 | 34 | 5.95300 | 56 | 3.03800 |
| 13 | 3.30300 | 35 | 6.12300 | 57 | 2.95800 |
| 14 | 3.52200 | 36 | 6.28800 | 58 | 2.94800 |
| 15 | 3.71200 | 37 | 6.41800 | 59 | 2.95800 |
| 16 | 3.91200 | 38 | 6.51300 | 60 | 2.96900 |
| 17 | 4.15200 | 39 | 6.55300 | 61 | 2.98900 |
| 18 | 4.41000 | 40 | 6.53000 | 62 | 3.03300 |
| 19 | 4.73000 | 41 | 6.47000 | 63 | 3.09800 |
| 20 | 5.03600 | 42 | 6.35300 | | |
| 21 | 5.32600 | 43 | 6.16300 | | |

EXAMPLE 4

Table 4 shows data for a pattern of the phase grating P according to example 4. The data is shown graphically in FIG. 7. In example 4, the phase gap $\Delta P$ is $0.99\pi$.

TABLE 4

$\Delta P = 0.99\ \pi$

| Coord. | δ | Coord. | δ | Coord. | δ |
|---|---|---|---|---|---|
| 0 | 1.57900 | 22 | 2.15900 | 44 | 2.38400 |
| 1 | 1.63900 | 23 | 2.39900 | 45 | 2.11400 |
| 2 | 1.66700 | 24 | 2.60700 | 46 | 1.93200 |
| 3 | 1.69700 | 25 | 2.81700 | 47 | 1.81200 |
| 4 | 1.73900 | 26 | 3.04600 | 48 | 1.74600 |
| 5 | 1.74400 | 27 | 3.25600 | 49 | 1.75600 |
| 6 | 1.73000 | 28 | 3.49200 | 50 | 1.82500 |
| 7 | 1.70000 | 29 | 3.71200 | 51 | 1.96500 |
| 8 | 1.55400 | 30 | 3.90500 | 52 | 2.26500 |
| 9 | 1.25400 | 31 | 4.02500 | 53 | 2.82500 |
| 10 | 0.71100 | 32 | 4.06700 | 54 | 3.47800 |
| 11 | 0.25100 | 33 | 4.04700 | 55 | 3.87800 |
| 12 | 0.05000 | 34 | 3.97200 | 56 | 4.09500 |
| 13 | 0.00000 | 35 | 3.84200 | 57 | 4.23500 |
| 14 | 0.04100 | 36 | 3.70100 | 58 | 4.34700 |
| 15 | 0.12100 | 37 | 3.57100 | 59 | 4.43700 |
| 16 | 0.28200 | 38 | 3.44500 | 60 | 4.50400 |
| 17 | 0.50200 | 39 | 3.33500 | 61 | 4.55400 |
| 18 | 0.80200 | 40 | 3.22000 | 62 | 4.62600 |
| 19 | 1.15200 | 41 | 3.09000 | 63 | 4.68600 |
| 20 | 1.52900 | 42 | 2.90600 | | |
| 21 | 1.87900 | 43 | 2.65600 | | |

EXAMPLE 5

Table 5 shows data for a pattern of the phase grating P according to example 5. The data is shown graphically in FIG. 8. In example 5, the phase gap $\Delta P$ is $1.00\pi$.

TABLE 5

$\Delta P = 1.00\ \pi$

| Coord. | δ | Coord. | δ | Coord. | δ |
|---|---|---|---|---|---|
| 0 | 0.00000 | 22 | 5.13656 | 44 | 5.80812 |
| 1 | 0.03494 | 23 | 5.21307 | 45 | 5.60323 |
| 2 | 0.08372 | 24 | 5.20778 | 46 | 5.37918 |
| 3 | 0.17593 | 25 | 5.13788 | 47 | 5.12460 |
| 4 | 0.29127 | 26 | 4.97072 | 48 | 4.88807 |
| 5 | 0.41957 | 27 | 4.73558 | 49 | 4.68950 |
| 6 | 0.57022 | 28 | 4.48842 | 50 | 4.48952 |
| 7 | 0.77908 | 29 | 4.32697 | 51 | 4.29759 |
| 8 | 1.04067 | 30 | 4.24668 | 52 | 4.05168 |
| 9 | 1.33889 | 31 | 4.24576 | 53 | 3.80124 |
| 10 | 1.70048 | 32 | 4.27485 | 54 | 3.56782 |
| 11 | 2.04910 | 33 | 4.39394 | 55 | 3.34777 |
| 12 | 2.38318 | 34 | 4.58241 | 56 | 3.19436 |
| 13 | 2.68329 | 35 | 4.84203 | 57 | 3.08368 |
| 14 | 2.97144 | 36 | 5.19737 | 58 | 3.01120 |
| 15 | 3.26819 | 37 | 5.51068 | 59 | 2.97107 |
| 16 | 3.58289 | 38 | 5.77602 | 60 | 2.96391 |
| 17 | 3.93565 | 39 | 5.94409 | 61 | 2.98987 |
| 18 | 4.28787 | 40 | 6.03755 | 62 | 2.99927 |
| 19 | 4.60094 | 41 | 6.07922 | 63 | 3.13750 |
| 20 | 4.85049 | 42 | 6.05674 | | |
| 21 | 5.03591 | 43 | 5.96950 | | |

EXAMPLE 6

Table 6 shows data for a pattern of the phase grating P according to example 6. The data is shown graphically in FIG. 9. In example 6, the phase gap $\Delta P$ is $1.01\pi$.

TABLE 6

$\Delta P = 1.01\ \pi$

| Coord. | δ | Coord. | δ | Coord. | δ |
|---|---|---|---|---|---|
| 0 | 0.00000 | 22 | 9.01142 | 44 | 7.39884 |
| 1 | 0.11900 | 23 | 9.28050 | 45 | 7.47793 |
| 2 | 0.38167 | 24 | 9.40910 | 46 | 7.70302 |
| 3 | 0.86576 | 25 | 9.51318 | 47 | 8.32711 |
| 4 | 1.60085 | 26 | 9.57577 | 48 | 8.88019 |
| 5 | 2.24994 | 27 | 9.42985 | 49 | 8.91217 |
| 6 | 2.70552 | 28 | 8.82495 | 50 | 8.63937 |
| 7 | 3.15461 | 29 | 8.55903 | 51 | 8.24345 |
| 8 | 3.79220 | 30 | 8.57712 | 52 | 7.86954 |
| 9 | 4.65129 | 31 | 8.64120 | 53 | 7.49862 |
| 10 | 5.33787 | 32 | 8.69029 | 54 | 6.90022 |
| 11 | 5.83696 | 33 | 8.68438 | 55 | 6.09930 |
| 12 | 6.33905 | 34 | 8.73447 | 56 | 5.52989 |
| 13 | 6.84314 | 35 | 9.13856 | 57 | 5.20897 |
| 14 | 7.22122 | 36 | 9.91164 | 58 | 4.85157 |
| 15 | 7.25031 | 37 | 10.12573 | 59 | 4.33065 |
| 16 | 6.79540 | 38 | 10.16132 | 60 | 3.66374 |
| 17 | 6.30948 | 39 | 10.14541 | 61 | 3.27782 |
| 18 | 6.15257 | 40 | 10.08499 | 62 | 3.13342 |
| 19 | 6.17165 | 41 | 9.91408 | 63 | 3.17750 |
| 20 | 6.27975 | 42 | 8.31967 | | |
| 21 | 7.34883 | 43 | 7.42876 | | |

EXAMPLE 7

Table 7 shows data for a pattern of the phase grating P according to example 7. The data is shown graphically in FIG. 10. In example 7, the phase gap $\Delta P$ is $0.98\pi$.

TABLE 7

ΔP = 0.98 π

| Coord. | δ | Coord. | δ | Coord. | δ |
|---|---|---|---|---|---|
| 0 | 0.00000 | 22 | 9.18279 | 44 | 8.33523 |
| 1 | 0.10112 | 23 | 9.81372 | 45 | 7.85733 |
| 2 | 0.21482 | 24 | 10.31935 | 46 | 7.25375 |
| 3 | 0.46317 | 25 | 10.74935 | 47 | 6.51311 |
| 4 | 0.87331 | 26 | 11.07071 | 48 | 5.96011 |
| 5 | 1.39192 | 27 | 11.23482 | 49 | 5.55847 |
| 6 | 1.73829 | 28 | 11.08046 | 50 | 5.07889 |
| 7 | 1.78828 | 29 | 10.43581 | 51 | 4.47400 |
| 8 | 1.74891 | 30 | 9.96051 | 52 | 4.01530 |
| 9 | 1.68984 | 31 | 9.86263 | 53 | 3.87218 |
| 10 | 1.76142 | 32 | 9.91072 | 54 | 3.90177 |
| 11 | 2.02072 | 33 | 10.11877 | 55 | 4.04902 |
| 12 | 2.55159 | 34 | 10.68425 | 56 | 4.20056 |
| 13 | 3.28166 | 35 | 11.42907 | 57 | 4.21774 |
| 14 | 3.83542 | 36 | 11.68461 | 58 | 4.00155 |
| 15 | 4.34223 | 37 | 11.60267 | 59 | 3.56311 |
| 16 | 4.99540 | 38 | 11.38748 | 60 | 3.24915 |
| 17 | 5.83822 | 39 | 11.05666 | 61 | 3.11798 |
| 18 | 6.55497 | 40 | 10.65121 | 62 | 3.08845 |
| 19 | 7.10304 | 41 | 10.11445 | 63 | 3.09300 |
| 20 | 7.68791 | 42 | 9.43005 | | |
| 21 | 8.41221 | 43 | 8.81092 | | |

EXAMPLE 8

Table 8 shows data for a pattern of the phase grating P according to example 8. The data is shown graphically in FIG. 11. In example 8, the phase gap ΔP is 1.14π.

TABLE 8

ΔP = 1.14

| Coord. | δ | Coord. | δ | Coord. | δ |
|---|---|---|---|---|---|
| 0 | 0.00000 | 22 | 8.14593 | 44 | 6.38976 |
| 1 | 0.35675 | 23 | 8.06924 | 45 | 6.15963 |
| 2 | 0.59145 | 24 | 7.78458 | 46 | 5.82247 |
| 3 | 1.02421 | 25 | 7.15265 | 47 | 5.41843 |
| 4 | 1.76643 | 26 | 6.44611 | 48 | 4.98783 |
| 5 | 2.45950 | 27 | 5.97778 | 49 | 4.50606 |
| 6 | 2.97905 | 28 | 5.63530 | 50 | 4.05856 |
| 7 | 3.46447 | 29 | 5.27806 | 51 | 3.78350 |
| 8 | 4.30512 | 30 | 4.81668 | 52 | 3.74228 |
| 9 | 5.26163 | 31 | 4.14179 | 53 | 4.15449 |
| 10 | 5.78634 | 32 | 3.46774 | 54 | 5.00983 |
| 11 | 6.07644 | 33 | 3.08316 | 55 | 5.34813 |
| 12 | 6.23928 | 34 | 2.88663 | 56 | 5.39878 |
| 13 | 6.33414 | 35 | 2.84806 | 57 | 5.22764 |
| 14 | 6.27698 | 36 | 3.03808 | 58 | 4.60923 |
| 15 | 6.11553 | 37 | 3.51615 | 59 | 3.77745 |
| 16 | 5.97524 | 38 | 4.17024 | 60 | 3.46904 |
| 17 | 5.92432 | 39 | 4.54980 | 61 | 3.39766 |
| 18 | 6.05341 | 40 | 4.92638 | 62 | 3.41174 |
| 19 | 6.40250 | 41 | 5.62633 | 63 | 3.59185 |
| 20 | 7.41097 | 42 | 6.27292 | | |
| 21 | 8.03059 | 43 | 6.49224 | | |

EXAMPLE 9

Table 9 shows dicta for a pattern of the phase grating P according to example 9. The data is shown graphically in FIG. 12. In example 93, the phase gap ΔP is 0.86π.

TABLE 9

ΔP = 0.86 π

| Coord. | δ | Coord. | δ | Coord. | δ |
|---|---|---|---|---|---|
| 0 | 0.00000 | 22 | 10.41512 | 44 | 11.31028 |
| 1 | 0.02139 | 23 | 10.45448 | 45 | 11.04914 |
| 2 | 0.24455 | 24 | 10.66319 | 46 | 10.70588 |
| 3 | 0.63197 | 25 | 11.05519 | 47 | 10.49409 |
| 4 | 1.25970 | 26 | 11.52474 | 48 | 10.31520 |
| 5 | 1.93395 | 27 | 11.90449 | 49 | 10.09816 |
| 6 | 2.45426 | 28 | 12.17922 | 50 | 9.41989 |
| 7 | 2.94875 | 29 | 12.38914 | 51 | 8.18725 |
| 8 | 3.67947 | 30 | 12.57125 | 52 | 7.75399 |
| 9 | 4.63407 | 31 | 12.71915 | 53 | 7.51219 |
| 10 | 5.28644 | 32 | 12.78723 | 54 | 7.14200 |
| 11 | 5.75541 | 33 | 12.73151 | 55 | 6.22557 |
| 12 | 6.29385 | 34 | 12.67358 | 56 | 5.34703 |
| 13 | 7.22466 | 35 | 12.59483 | 57 | 4.96071 |
| 14 | 8.10410 | 36 | 12.48228 | 58 | 4.61458 |
| 15 | 8.59831 | 37 | 12.25170 | 59 | 4.07851 |
| 16 | 8.96738 | 38 | 11.83332 | 60 | 3.42295 |
| 17 | 9.36434 | 39 | 11.38850 | 61 | 3.06471 |
| 18 | 9.85078 | 40 | 11.15996 | 62 | 2.90472 |
| 19 | 10.26310 | 41 | 11.13878 | 63 | 2.69100 |
| 20 | 10.46203 | 42 | 11.22934 | | |
| 21 | 10.45751 | 43 | 11.33304 | | |

EXAMPLE 10

Table 10 shows data for a pattern of the phase grating P according to examples 10. The data is shown graphically in FIG. 13. In example 10, the phase gap ΔP is 1.07π.

TABLE 10

ΔP = 1.07 π

| Coord. | δ | Coord. | δ | Coord. | δ |
|---|---|---|---|---|---|
| 0 | 1.88359 | 22 | 6.11453 | 44 | 0.00000 |
| 1 | 2.20660 | 23 | 5.47716 | 45 | 0.11027 |
| 2 | 2.55505 | 24 | 4.92379 | 46 | 0.55334 |
| 3 | 2.96194 | 25 | 4.32768 | 47 | 1.03784 |
| 4 | 3.50884 | 26 | 3.82595 | 48 | 1.31994 |
| 5 | 4.12613 | 27 | 3.35523 | 49 | 1.57085 |
| 6 | 4.76767 | 28 | 2.90596 | 50 | 1.87626 |
| 7 | 5.47822 | 29 | 2.32512 | 51 | 2.43060 |
| 8 | 6.13673 | 30 | 1.74405 | 52 | 3.02974 |
| 9 | 6.68710 | 31 | 1.41813 | 53 | 3.35112 |
| 10 | 7.20112 | 32 | 1.33906 | 54 | 3.36775 |
| 11 | 7.89495 | 33 | 1.50709 | 55 | 3.30493 |
| 12 | 9.04040 | 34 | 1.88758 | 56 | 3.22809 |
| 13 | 9.57330 | 35 | 2.18736 | 57 | 3.38151 |
| 14 | 9.71868 | 36 | 2.27226 | 58 | 3.63778 |
| 15 | 9.62977 | 37 | 2.04002 | 59 | 3.99318 |
| 16 | 9.28356 | 38 | 1.53403 | 60 | 4.32386 |
| 17 | 8.61084 | 39 | 1.01003 | 61 | 4.56700 |
| 18 | 8.05756 | 40 | 0.69457 | 62 | 4.81525 |
| 19 | 7.66091 | 41 | 0.47837 | 63 | 5.24823 |
| 20 | 7.25906 | 42 | 0.31341 | | |
| 21 | 6.74087 | 43 | 0.09924 | | |

EXAMPLE 11

Table 11 shows data for a pattern of the phase grating P according to example 11. The data is shown graphically in FIG. 14. In example 11, the phase gap ΔP is 1.04π.

TABLE 11

ΔP = 1.04 π

| Coord. | δ | Coord. | δ | Coord. | δ |
|---|---|---|---|---|---|
| 0 | 5.72434 | 22 | 3.36629 | 44 | 2.81337 |
| 1 | 5.63396 | 23 | 3.48561 | 45 | 3.34012 |
| 2 | 5.50930 | 24 | 3.42313 | 46 | 3.80482 |
| 3 | 5.27261 | 25 | 3.12300 | 47 | 4.35758 |
| 4 | 4.88795 | 26 | 2.69584 | 48 | 4.96980 |
| 5 | 4.30602 | 27 | 2.35180 | 49 | 5.69287 |
| 6 | 3.64948 | 28 | 1.99120 | 50 | 6.46242 |
| 7 | 3.08115 | 29 | 1.63443 | 51 | 7.23784 |
| 8 | 2.55867 | 30 | 1.17193 | 52 | 7.81849 |
| 9 | 1.97143 | 31 | 0.85687 | 53 | 8.30500 |
| 10 | 1.34005 | 32 | 0.75565 | 54 | 8.79971 |
| 11 | 0.79516 | 33 | 0.92786 | 55 | 9.44981 |
| 12 | 0.40111 | 34 | 1.14320 | 56 | 9.93265 |
| 13 | 0.10653 | 35 | 1.34150 | 57 | 10.15751 |
| 14 | 0.00000 | 36 | 1.34215 | 58 | 10.06035 |
| 15 | 0.05143 | 37 | 1.13101 | 59 | 9.80890 |
| 16 | 0.39145 | 38 | 0.74260 | 60 | 9.48861 |
| 17 | 0.97952 | 39 | 0.50082 | 61 | 9.27769 |
| 18 | 1.48361 | 40 | 0.45241 | 62 | 9.11678 |
| 19 | 1.93317 | 41 | 0.64103 | 63 | 8.98587 |
| 20 | 2.36975 | 42 | 1.08511 | | |
| 21 | 2.92970 | 43 | 2.01522 | | |

EXAMPLE 12

Table 12 shows data for a pattern of the phase grating P according to examples 12. The data is shown graphically in FIG. 15. In example 12, the phase gap ΔP is 0.98π.

TABLE 12

ΔP = .98 π

| Coord. | δ | Coord. | δ | Coord. | δ |
|---|---|---|---|---|---|
| 0 | 1.54498 | 22 | 5.12490 | 44 | 4.58932 |
| 1 | 1.53807 | 23 | 5.76799 | 45 | 4.08540 |
| 2 | 1.47715 | 24 | 6.51557 | 46 | 3.64850 |
| 3 | 1.24424 | 25 | 7.20367 | 47 | 3.38558 |
| 4 | 0.73233 | 26 | 7.74924 | 48 | 3.32567 |
| 5 | 0.22242 | 27 | 8.19234 | 49 | 3.45876 |
| 6 | 0.00000 | 28 | 8.70042 | 50 | 3.70385 |
| 7 | 0.04708 | 29 | 9.36852 | 51 | 3.91694 |
| 8 | 0.38968 | 30 | 9.97109 | 52 | 3.97602 |
| 9 | 1.19776 | 31 | 10.29019 | 53 | 3.83511 |
| 10 | 1.79235 | 32 | 10.33327 | 54 | 3.20469 |
| 11 | 1.98643 | 33 | 10.09636 | 55 | 2.54279 |
| 12 | 1.97353 | 34 | 9.53795 | 56 | 2.38836 |
| 13 | 1.83361 | 35 | 8.96804 | 57 | 2.49146 |
| 14 | 1.66370 | 36 | 8.57712 | 58 | 2.85804 |
| 15 | 1.65178 | 37 | 8.20621 | 59 | 3.52314 |
| 16 | 1.84488 | 38 | 7.75680 | 60 | 4.08221 |
| 17 | 2.25997 | 39 | 7.15388 | 61 | 4.39631 |
| 18 | 2.82905 | 40 | 6.55447 | 62 | 4.55539 |
| 19 | 3.44314 | 41 | 6.03255 | 63 | 4.60899 |
| 20 | 4.01223 | 42 | 5.55515 | | |
| 21 | 4.55932 | 43 | 5.07323 | | |

Tables 13 and 14 show the output intensity for the emitted beams of the beam splitter 10 in each of the above twelve examples as a relative intensity when the intensity of the incident beam is defined as 1. Further, an effective intensity represents a sum of the intensities of the intended emitted beams as a percentage of the incident beam. As explained above, the intended emitted beams are, for example, in example 1, the four emitted beams of order −1 to +2, or in example 2, the eight emitted beams of order −3 to +4.

FIGS. 16–27 show the data of Tables 13 and 14 graphically, the horizontal axis represents the order of the emitted diffracted beam and the vertical axis represents the intensity of each order where the intensity of the incident beam is defined as 1.

TABLE 13

| Order | Ex. 1 | Ex. 2 | Ex. 3 | Ex. 4 | Ex. 5 | Ex. 6 |
|---|---|---|---|---|---|---|
| −10 | 0.00097 | 0.00396 | 0.00162 | 0.00142 | 0.00142 | 0.00123 |
| −9 | 0.00113 | 0.00850 | 0.00503 | 0.00526 | 0.00136 | 0.00568 |
| −8 | 0.00126 | 0.00762 | 0.00528 | 0.00273 | 0.00244 | 0.00207 |
| −7 | 0.00207 | 0.00171 | 0.00186 | 0.00440 | 0.00068 | 0.05752 |
| −6 | 0.00257 | 0.00093 | 0.00023 | 0.00048 | 0.00513 | 0.05869 |
| −5 | 0.00201 | 0.00156 | 0.00039 | 0.00091 | 0.00011 | 0.05867 |
| −4 | 0.00874 | 0.00584 | 0.00316 | 0.00175 | 0.00007 | 0.05900 |
| −3 | 0.01013 | 0.11779 | 0.11830 | 0.11805 | 0.12016 | 0.05797 |
| −2 | 0.00226 | 0.11917 | 0.11781 | 0.11865 | 0.11955 | 0.05872 |
| −1 | 0.22965 | 0.11753 | 0.11965 | 0.11949 | 0.12001 | 0.05928 |
| 0 | 0.23019 | 0.11745 | 0.11878 | 0.11879 | 0.12056 | 0.05975 |
| 1 | 0.23039 | 0.11841 | 0.11876 | 0.11903 | 0.12045 | 0.05970 |
| 2 | 0.22923 | 0.11717 | 0.11962 | 0.11942 | 0.11997 | 0.05907 |
| 3 | 0.00231 | 0.11643 | 0.11770 | 0.11859 | 0.11957 | 0.05875 |
| 4 | 0.01049 | 0.11663 | 0.11824 | 0.11794 | 0.12017 | 0.05798 |
| 5 | 0.00898 | 0.00126 | 0.00320 | 0.00174 | 0.00004 | 0.05911 |
| 6 | 0.00213 | 0.00462 | 0.00046 | 0.00092 | 0.00019 | 0.05861 |
| 7 | 0.00282 | 0.00004 | 0.00022 | 0.00056 | 0.00550 | 0.05882 |
| 8 | 0.00225 | 0.00227 | 0.00184 | 0.00444 | 0.00073 | 0.05750 |
| 9 | 0.00137 | 0.00003 | 0.00521 | 0.00279 | 0.00263 | 0.00253 |
| 10 | 0.00133 | 0.00397 | 0.00499 | 0.00527 | 0.00158 | 0.00658 |
| Effec. | 91.95% | 94.06% | 94.89% | 95.00% | 96.04% | 93.91% |

TABLE 14

| Order | Ex. 7 | Ex. 8 | Ex. 9 | Ex. 10 | Ex. 11 | Ex. 12 |
|---|---|---|---|---|---|---|
| −10 | 0.00165 | 0.00019 | 0.00024 | 0.00004 | 0.00052 | 0.00020 |
| −9 | 0.00089 | 0.00053 | 0.00002 | 0.00106 | 0.00117 | 0.00017 |
| −8 | 0.00457 | 0.00028 | 0.00292 | 0.00098 | 0.00028 | 0.00092 |
| −7 | 0.06045 | 0.05997 | 0.06068 | 0.06070 | 0.06086 | 0.06125 |
| −6 | 0.06056 | 0.06019 | 0.06117 | 0.06027 | 0.06086 | 0.06103 |
| −5 | 0.06008 | 0.06018 | 0.06126 | 0.06076 | 0.06076 | 0.06091 |
| −4 | 0.06037 | 0.05995 | 0.06077 | 0.06038 | 0.06097 | 0.06116 |
| −3 | 0.06089 | 0.06015 | 0.06083 | 0.06078 | 0.06078 | 0.06105 |
| −2 | 0.06033 | 0.06017 | 0.06074 | 0.06065 | 0.06085 | 0.06115 |
| −1 | 0.06028 | 0.06058 | 0.06070 | 0.06044 | 0.06101 | 0.06122 |
| 0 | 0.06020 | 0.06056 | 0.06061 | 0.06092 | 0.06116 | 0.06107 |
| 1 | 0.06023 | 0.06050 | 0.06051 | 0.06082 | 0.06092 | 0.06105 |
| 2 | 0.06022 | 0.06060 | 0.06043 | 0.06087 | 0.06099 | 0.06118 |
| 3 | 0.06041 | 0.06108 | 0.06063 | 0.06111 | 0.06106 | 0.06115 |
| 4 | 0.06087 | 0.06074 | 0.06066 | 0.06119 | 0.06100 | 0.06095 |
| 5 | 0.06037 | 0.06055 | 0.06053 | 0.06127 | 0.06107 | 0.06110 |
| 6 | 9.06008 | 0.06092 | 0.06091 | 0.06057 | 0.06129 | 0.06093 |
| 7 | 0.06055 | 0.06035 | 0.06083 | 0.06116 | 0.06104 | 0.06102 |
| 8 | 0.06041 | 0.06129 | 0.06032 | 0.06099 | 0.06120 | 0.06118 |
| 9 | 0.00463 | 0.00144 | 0.00115 | 0.00113 | 0.00173 | 0.00111 |
| 10 | 0.00086 | 0.00187 | 0.00028 | 0.00021 | 0.00035 | 0.00026 |
| Effec | 96.63% | 96.78% | 97.16% | 97.29% | 97.58% | 97.74% |

As shown in table 13 and 14, the effective intensity of the intended emitted beams is more than 91% in each example and reaches as high as 97.74%.

Tables 15 and 16 show the intensity of the intended emitted beams as a percentage of an ideal value. For instance, in example 1, the ideal value of each emitted beam is 0.25 (4 emitted beams are desired) where the intensity of the incident beam is 1, however, the actual intensity of the emitted beam of −1 order is 0.22965 so that the percentage of the −1 order beam is 92%. Similarly, the ideal values are 0.125 in examples 2–4 (8 emitted beams are desired) and 0.0625 in examples 6–12 (16 emitted beams are desired).

TABLE 15

| Order | Ex. 1 | Ex. 2 | Ex. 3 | Ex. 4 | Ex. 5 | Ex. 6 |
|---|---|---|---|---|---|---|
| −7 | | | | | | 92% |
| −6 | | | | | | 94% |
| −5 | | | | | | 94% |
| −4 | | | | | | 94% |
| −3 | | 94% | 95% | 94% | 96% | 93% |
| −2 | | 95% | 94% | 95% | 96% | 94% |
| −1 | 92% | 94% | 96% | 96% | 96% | 95% |
| 0 | 92% | 94% | 95% | 95% | 96% | 96% |
| 1 | 92% | 95% | 95% | 95% | 96% | 96% |
| 2 | 92% | 94% | 96% | 96% | 96% | 95% |
| 3 | | 93% | 94% | 95% | 96% | 94% |
| 4 | | 93% | 95% | 94% | 96% | 93% |
| 5 | | | | | | 95% |
| 6 | | | | | | 94% |
| 7 | | | | | | 94% |
| 8 | | | | | | 92% |
| Δ | 0% | 2% | 2% | 2% | 0% | 4% |

TABLE 16

| Order | Ex. 7 | Ex. 8 | Ex. 9 | Ex. 10 | Ex. 11 | Ex. 12 |
|---|---|---|---|---|---|---|
| −7 | 97% | 96% | 97% | 97% | 97% | 98% |
| −6 | 97% | 96% | 98% | 96% | 97% | 98% |
| −5 | 96% | 96% | 98% | 97% | 97% | 97% |
| −4 | 97% | 96% | 97% | 97% | 98% | 98% |
| −3 | 97% | 96% | 97% | 97% | 97% | 98% |
| −2 | 97% | 96% | 97% | 97% | 97% | 98% |
| −1 | 96% | 97% | 97% | 97% | 98% | 98% |
| 0 | 96% | 97% | 97% | 97% | 98% | 98% |
| 1 | 96% | 97% | 97% | 97% | 97% | 98% |
| 2 | 96% | 97% | 97% | 97% | 98% | 98% |
| 3 | 97% | 98% | 97% | 98% | 98% | 98% |
| 4 | 97% | 97% | 97% | 98% | 98% | 98% |
| 5 | 97% | 97% | 97% | 98% | 98% | 98% |
| 6 | 96% | 97% | 97% | 97% | 98% | 97% |
| 7 | 97% | 97% | 97% | 98% | 98% | 98% |
| 8 | 97% | 98% | 97% | 98% | 98% | 98% |
| Δ | 1% | 2% | 1% | 2% | 1% | 1% |

As shown in Tables 15 and 16, the intensities of the intended emitted beams are in a range of 92%–98% in all examples. Further, a difference Δ between maximum and minimum percentage values is at most 4%. Accordingly, in these examples, the energy of the incident beam is effectively equally divided among the intended emitted beams.

The intensities shown in the above Tables and Figures represent ideal values. In considering some errors in the beam diffractive element, the efficiency will be reduced. In particular, if the error in the efficiency is to be under 10%, the permissible error in the pattern of the phase grating P is about 2%. For example, if the refractive index n of the environment is 1.5, the incident beam has a wavelength λ of 488 nm and is to be divided into 8 emitted beams every 0.0125 rad, the pattern has a length L along the y-axis of about 40 μm and a maximum height H along the z-axis of about 1 μμm. Here, the height H is defined as a difference between the highest and the lowest points in the phase pattern P. Thus, the permissible error in the height is only 0.02 μm.

However, the permissible error range can be extended. For example, if a difference between the refractive indexes of the phase grating P and the environment is decreased, the size of the phase pattern can be increased. That is, if the difference between refractive indexes is smaller, the height H can be larger. Accordingly, the required processing precision of the beam splitter 10 can be reduced. In a particular case, the concave surface 11a, including the. grating pattern 12, may be covered with a liquid layer having a refractive index that is almost equal to that of the grating pattern 12.

As described above, in each embodiment, the grating pattern is asymmetrical in the direction where the gratings are aligned. Thus the diffracted beams are not symmetrical with respect to zero order beam, and an even number of diffracted beams are generated. Further, the diffraction efficiency is raised by forming the grating pattern to have multi-level phase distribution, and energy of the incident beam is efficiently used.

It should be noted that the phase patterns described above should be optimized so that the diffracted beams consist substantially of a desired number (even number) of beams, and the desired number of beams have substantially the same intensities.

Although the structure and operation of a beam splitter is described herein with respect to the preferred embodiments, many modifications and changes can be made without departing from the spirit and scope of the invention.

Figure 28:
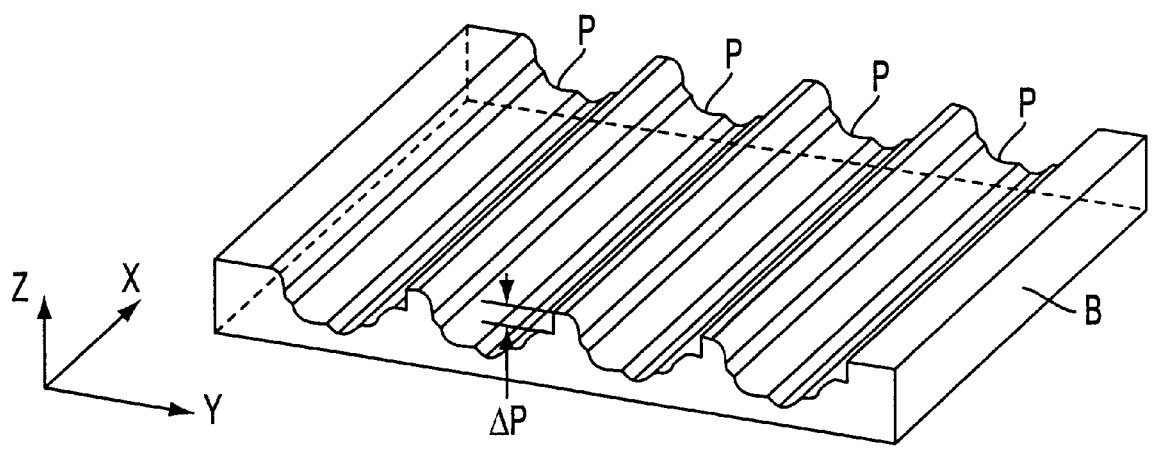
FIG. 28 is a perspective view of the beam splitter according to an alternative embodiment of the invention.

For example, as an alternative, the phase patterns P may be formed as substantially indenting into the base 11 (as shown in FIG. 28) rather than as substantially protruding from the base 11(as shown in FIG. 2). For examples given above, the alternative forms for the phase patterns P can be obtained if the reference point (i.e., the 0 point) remains the same but each of the phase differences δ are defined as negative values. In other words, the cross-section of the phase pattern in the Y-Z plane can be considered to be rotated about the Y-axis by 180 degrees to produce a mirror image of the phase pattern.

The present disclosure relates to subject matter contained in Japanese Patent Application Nos. HEI 08-198271, filed on Jul. 9, 1996, and HEI 08-198272, filed on Jul. 9, 1996, which are expressly incorporated herein by reference in their entirety.

What is claimed is:

1. A diffractive optical element, comprising:
    a base plate provided with a diffractive grating pattern, said diffractive grating pattern including a plurality of phase gratings arranged in parallel lines extending along a predetermined direction of said base plate to cause diffraction of an incident beam, wherein the beam incident on said diffractive grating pattern is divided and emitted into a plurality of diffracted beams,
    wherein each of said plurality of phase gratings has an asymmetrical phase pattern, to form a plurality of phase patterns, in a direction where said plurality of phase gratings are arranged,
    wherein, a phase gap ΔP, representing a phase difference between each adjoining end point and each beginning point of of said plurality of phase patterns along said predetermined direction, in radians, is substantially equal for each of said plurality of phase gratings and satisfies:

$0.7\pi < |\Delta P| < 1.2\pi;$ wherein each of said plurality of phase patterns does not have any phase gap ΔP between said beginning point and said end point of each respective one of said plurality of phase patterns; and
    wherein a phase difference within each of said plurality of phase patterns changes non-linearly and continuously.

2. The diffractive optical element according to claim 1, wherein a width of one of said plurality of phase gratings is divided equally into 64 coordinates and wherein each of said plurality of phase gratings is formed such that said phase differences and said 64 coordinates have a relationship indicated in a table below, and wherein said diffractive optical element divides said incident beam into 4 divided beams:

| Coord. | Phase | Coord. | Phase | Coord. | Phase |
|---|---|---|---|---|---|
| 0 | 0.00000 | 22 | 2.28947 | 44 | 2.89397 |
| 1 | 0.04000 | 23 | 2.51947 | 45 | 2.79397 |
| 2 | 0.10042 | 24 | 2.69518 | 46 | 2.74279 |
| 3 | 0.16042 | 25 | 2.86518 | 47 | 2.69279 |
| 4 | 0.21520 | 26 | 3.02656 | 48 | 2.67291 |
| 5 | 0.25520 | 27 | 3.14656 | 49 | 2.65291 |
| 6 | 0.32315 | 28 | 3.25191 | 50 | 2.66056 |
| 7 | 0.38315 | 29 | 3.35191 | 51 | 2.67056 |
| 8 | 0.44920 | 30 | 3.41679 | 52 | 2.67518 |
| 9 | 0.51920 | 31 | 3.48679 | 53 | 2.69518 |
| 10 | 0.59142 | 32 | 3.52997 | 54 | 2.72447 |
| 11 | 0.66142 | 33 | 3.55997 | 55 | 2.75447 |
| 12 | 0.75100 | 34 | 3.59951 | 56 | 2.79033 |
| 13 | 0.84100 | 35 | 3.59951 | 57 | 2.82033 |
| 14 | 0.94020 | 36 | 3.58770 | 58 | 2.86386 |
| 15 | 1.05020 | 37 | 3.55770 | 59 | 2.89386 |
| 16 | 1.17834 | 38 | 3.50415 | 60 | 2.94434 |
| 17 | 1.30834 | 39 | 3.44415 | 61 | 2.98434 |
| 18 | 1.46586 | 40 | 3.33870 | 62 | 3.03420 |
| 19 | 1.64586 | 41 | 3.21870 | 63 | 3.13420. |
| 20 | 1.84933 | 42 | 3.10951 | | |
| 21 | 2.06933 | 43 | 2.96951 | | |

3. The diffractive optical element according to claim 1, wherein a width of one of said plurality of phase gratings is divided equally into 64 coordinates and wherein each of said plurality of phase gratings is formed such that said phase differences and said 64 coordinates have a relationship indicated in a table below, and wherein said diffractive optical element divides said incident beam into 8 divided beams:

| Coord. | Phase | Coord. | Phase | Coord. | Phase |
|---|---|---|---|---|---|
| 0 | 2.34750 | 22 | 2.33100 | 44 | 6.16100 |
| 1 | 2.11350 | 23 | 2.54700 | 45 | 6.29850 |
| 2 | 2.10350 | 24 | 2.76700 | 46 | 6.38850 |
| 3 | 2.11700 | 25 | 2.98600 | 47 | 6.46600 |
| 4 | 2.13200 | 26 | 3.23600 | 48 | 6.51600 |
| 5 | 2.14700 | 27 | 3.57850 | 49 | 6.53700 |
| 6 | 2.14700 | 28 | 4.10850 | 50 | 6.48700 |
| 7 | 2.10350 | 29 | 4.68100 | 51 | 6.38100 |
| 8 | 1.96350 | 30 | 5.10100 | 52 | 6.17100 |
| 9 | 1.32750 | 31 | 5.39450 | 53 | 5.85000 |
| 10 | 0.36750 | 32 | 5.57450 | 54 | 5.47000 |
| 11 | 0.07000 | 33 | 5.70650 | 55 | 5.22600 |
| 12 | 0.00000 | 34 | 5.79650 | 56 | 5.06600 |
| 13 | 0.02550 | 35 | 5.84250 | 57 | 4.99800 |
| 14 | 0.12550 | 36 | 5.88250 | 58 | 4.94800 |
| 15 | 0.23800 | 37 | 5.89250 | 59 | 4.93550 |
| 16 | 0.40800 | 38 | 5.89250 | 60 | 4.92550 |
| 17 | 0.65600 | 39 | 5.89650 | 61 | 4.91000 |
| 18 | 0.96600 | 40 | 5.90650 | 62 | 4.89000 |
| 19 | 1.34000 | 41 | 5.91450 | 63 | 4.70250. |
| 20 | 1.72000 | 42 | 5.96450 | | |
| 21 | 2.05100 | 43 | 6.06100 | | |

4. The diffractive optical element according to claim 1, wherein a width of one of said plurality of phase gratings is divided equally into 64 coordinates and wherein each of said plurality of phase gratings is formed such that said phase differences and said 64 coordinates have a relationship indicated in a table below, and wherein said diffractive optical element divides said incident beam into 8 divided beams:

| Coord. | Phase | Coord. | Phase | Coord. | Phase |
|---|---|---|---|---|---|
| 0 | 0.00000 | 22 | 5.53800 | 44 | 5.95500 |
| 1 | 0.04000 | 23 | 5.69800 | 45 | 5.74500 |
| 2 | 0.08700 | 24 | 5.81200 | 46 | 5.57400 |
| 3 | 0.16700 | 25 | 5.87200 | 47 | 5.43400 |
| 4 | 0.24600 | 26 | 5.88400 | 48 | 5.33000 |
| 5 | 0.35600 | 27 | 5.85400 | 49 | 5.23000 |
| 6 | 0.45900 | 28 | 5.78500 | 50 | 5.11400 |
| 7 | 0.63900 | 29 | 5.70500 | 51 | 4.94400 |
| 8 | 0.88800 | 30 | 5.63700 | 52 | 4.63400 |
| 9 | 1.31800 | 31 | 5.63700 | 53 | 4.11400 |
| 10 | 1.99700 | 32 | 5.67800 | 54 | 3.52200 |
| 11 | 2.65700 | 33 | 5.79800 | 55 | 3.20200 |
| 12 | 3.03300 | 34 | 5.95300 | 56 | 3.03800 |
| 13 | 3.30300 | 35 | 6.12300 | 57 | 2.95800 |
| 14 | 3.52200 | 36 | 6.28800 | 58 | 2.94800 |
| 15 | 3.71200 | 37 | 6.41800 | 59 | 2.95800 |
| 16 | 3.91200 | 38 | 6.51300 | 60 | 2.96900 |
| 17 | 4.15200 | 39 | 6.55300 | 61 | 2.98900 |
| 18 | 4.41000 | 40 | 6.53000 | 62 | 3.03300 |
| 19 | 4.73000 | 41 | 6.47000 | 63 | 3.09800. |
| 20 | 5.03600 | 42 | 6.35300 | | |
| 21 | 5.32600 | 43 | 6.16300 | | |

5. The diffractive optical element according to claim 1, wherein a width of one of said plurality of phase gratings is divided equally into 64 coordinates and wherein each of said plurality of phase gratings is formed such that said phase differences and said 64 coordinates have a relationship indicated in a table below, and wherein said diffractive optical element divides said incident beam into 8 divided beams:

| Coord. | Phase | Coord. | Phase | Coord. | Phase |
|---|---|---|---|---|---|
| 0 | 1.57900 | 22 | 2.15900 | 44 | 2.38400 |
| 1 | 1.63900 | 23 | 2.39900 | 45 | 2.11400 |
| 2 | 1.66700 | 24 | 2.60700 | 46 | 1.93200 |
| 3 | 1.69700 | 25 | 2.81700 | 47 | 1.81200 |
| 4 | 1.73900 | 26 | 3.04600 | 48 | 1.74600 |
| 5 | 1.74400 | 27 | 3.25600 | 49 | 1.75600 |
| 6 | 1.73000 | 28 | 3.49200 | 50 | 1.82500 |
| 7 | 1.70000 | 29 | 3.71200 | 51 | 1.96500 |
| 8 | 1.55400 | 30 | 3.90500 | 52 | 2.26500 |
| 9 | 1.25400 | 31 | 4.02500 | 53 | 2.82500 |
| 10 | 0.71100 | 32 | 4.06700 | 54 | 3.47800 |
| 11 | 0.25100 | 33 | 4.04700 | 55 | 3.87800 |
| 12 | 0.05000 | 34 | 3.97200 | 56 | 4.09500 |
| 13 | 0.00000 | 35 | 3.84200 | 57 | 4.23500 |
| 14 | 0.04100 | 36 | 3.70100 | 58 | 4.34700 |
| 15 | 0.12100 | 37 | 3.57100 | 59 | 4.43700 |
| 16 | 0.28200 | 38 | 3.44500 | 60 | 4.50400 |
| 17 | 0.50200 | 39 | 3.33500 | 61 | 4.55400 |
| 18 | 0.80200 | 40 | 3.22000 | 62 | 4.62600 |
| 19 | 1.15200 | 41 | 3.09000 | 63 | 4.68600. |
| 20 | 1.52900 | 42 | 2.90600 | | |
| 21 | 1.87900 | 43 | 2.65600 | | |

6. The diffractive optical element according to claim 1, wherein a width of one of said plurality of phase gratings is divided equally into 64 coordinates and wherein each of said plurality of phase gratings is formed such that said phase differences and said 64 coordinates have a relationship indicated in a table below, and wherein said diffractive optical element divides said incident beam into 8 divided beams;

| Coord. | Phase | Coord. | Phase | Coord. | Phase |
|---|---|---|---|---|---|
| 0 | 0.00000 | 22 | 5.13656 | 44 | 5.80812 |
| 1 | 0.03494 | 23 | 5.21307 | 45 | 5.60323 |
| 2 | 0.08372 | 24 | 5.20778 | 46 | 5.37918 |
| 3 | 0.17593 | 25 | 5.13788 | 47 | 5.12460 |
| 4 | 0.29127 | 26 | 4.97072 | 48 | 4.88807 |
| 5 | 0.41957 | 27 | 4.73558 | 49 | 4.68950 |
| 6 | 0.57022 | 28 | 4.48842 | 50 | 4.48952 |
| 7 | 0.77908 | 29 | 4.32697 | 51 | 4.29759 |
| 8 | 1.04067 | 30 | 4.24668 | 52 | 4.05168 |
| 9 | 1.33889 | 31 | 4.24576 | 53 | 3.80124 |
| 10 | 1.70048 | 32 | 4.27485 | 54 | 3.56782 |
| 11 | 2.04910 | 33 | 4.39394 | 55 | 3.34777 |
| 12 | 2.38318 | 34 | 4.58241 | 56 | 3.19436 |
| 13 | 2.68329 | 35 | 4.84203 | 57 | 3.08368 |
| 14 | 2.97144 | 36 | 5.19737 | 58 | 3.01120 |
| 15 | 3.26819 | 37 | 5.51068 | 59 | 2.97107 |
| 16 | 3.58289 | 38 | 5.77602 | 60 | 2.96391 |
| 17 | 3.93565 | 39 | 5.94409 | 61 | 2.98987 |
| 18 | 4.28787 | 40 | 6.03755 | 62 | 2.99927 |
| 19 | 4.60094 | 41 | 6.07922 | 63 | 3.13750. |
| 20 | 4.85049 | 42 | 6.05674 |   |   |
| 21 | 5.03591 | 43 | 5.96950 |   |   |

7. The diffractive optical element according to claim 1, wherein a width of one of said plurality of phase gratings is divided equally into 64 coordinates and wherein each of said plurality of phase gratings is formed such that said phase differences and said 64 coordinates have a relationship indicated in a table below, and wherein said diffractive optical element divides said incident beam into 16 divided beams;

| Coord. | Phase | Coord. | Phase | Coord. | Phase |
|---|---|---|---|---|---|
| 0 | 0.00000 | 22 | 9.01142 | 44 | 7.39884 |
| 1 | 0.11909 | 23 | 9.28050 | 45 | 7.47793 |
| 2 | 0.38167 | 24 | 9.40910 | 46 | 7.70302 |
| 3 | 0.86576 | 25 | 9.51318 | 47 | 8.32711 |
| 4 | 1.60085 | 26 | 9.57577 | 48 | 8.88019 |
| 5 | 2.24994 | 27 | 9.42985 | 49 | 8.91927 |
| 6 | 2.70552 | 28 | 8.82495 | 50 | 8.63937 |
| 7 | 3.15461 | 29 | 8.55903 | 51 | 8.24345 |
| 8 | 3.79220 | 30 | 8.57712 | 52 | 7.86954 |
| 9 | 4.65129 | 31 | 8.64120 | 53 | 7.49862 |
| 10 | 5.33787 | 32 | 8.69029 | 54 | 6.90022 |
| 11 | 5.83696 | 33 | 8.68438 | 55 | 6.09930 |
| 12 | 6.33905 | 34 | 8.73447 | 56 | 5.52989 |
| 13 | 6.84314 | 35 | 9.13856 | 57 | 5.20897 |
| 14 | 7.22122 | 36 | 9.91164 | 58 | 4.85157 |
| 15 | 7.25031 | 37 | 10.12573 | 59 | 4.33065 |
| 16 | 6.79540 | 38 | 10.16132 | 60 | 3.66374 |
| 17 | 6.30948 | 39 | 10.14541 | 61 | 3.27782 |
| 18 | 6.15257 | 40 | 10.08499 | 62 | 3.13342 |
| 19 | 6.17165 | 41 | 9.91408 | 63 | 3.17750. |
| 20 | 6.27975 | 42 | 8.31967 |   |   |
| 21 | 7.34883 | 43 | 7.42876 |   |   |

8. The diffractive optical element according to claim 1, wherein a width of one of said plurality of phase gratings is divided equally into 64 coordinates and wherein each of said plurality of phase gratings is formed such that said phase differences and said 64 coordinates have a relationship indicated in a table below, and wherein said diffractive optical element divides said incident beam into 16 divided beams;

| Coord. | Phase | Coord. | Phase | Coord. | Phase |
|---|---|---|---|---|---|
| 0 | 0.00000 | 22 | 9.18279 | 44 | 8.33523 |
| 1 | 0.10112 | 23 | 9.81372 | 45 | 7.85733 |
| 2 | 0.21482 | 24 | 10.31935 | 46 | 7.25375 |
| 3 | 0.46317 | 25 | 10.74935 | 47 | 6.51311 |
| 4 | 0.87331 | 26 | 11.07071 | 48 | 5.96011 |
| 5 | 1.39192 | 27 | 11.23482 | 49 | 5.55847 |
| 6 | 1.73829 | 28 | 11.08046 | 50 | 5.07889 |
| 7 | 1.78828 | 29 | 10.43581 | 51 | 4.47400 |
| 8 | 1.74891 | 30 | 9.96051 | 52 | 4.01530 |
| 9 | 1.68984 | 31 | 9.86263 | 53 | 3.87218 |
| 10 | 1.76142 | 32 | 9.91072 | 54 | 3.90177 |
| 11 | 2.02072 | 33 | 10.11877 | 55 | 4.04902 |
| 12 | 2.55159 | 34 | 10.68425 | 56 | 4.20056 |
| 13 | 3.28166 | 35 | 11.42907 | 57 | 4.21774 |
| 14 | 3.83542 | 36 | 11.68461 | 58 | 4.00155 |
| 15 | 4.34223 | 37 | 11.60267 | 59 | 3.56311 |
| 16 | 4.99540 | 38 | 11.38748 | 60 | 3.24915 |
| 17 | 5.83822 | 39 | 11.05666 | 61 | 3.11798 |
| 18 | 6.55497 | 40 | 10.65121 | 62 | 3.08845 |
| 19 | 7.10304 | 41 | 10.11445 | 63 | 3.09300. |

9. The diffractive optical element according to claim 1, wherein a width of one of said plurality of phase gratings is divided equally into 64 coordinates and wherein each of said plurality of phase gratings is formed such that said phase differences and said 64 coordinates Save a relationship indicated in a table below, and wherein said diffractive optical element divides said incident beam into 16 divided beams;

| Coord. | Phase | Coord. | Phase | Coord. | Phase |
|---|---|---|---|---|---|
| 0 | 0.00000 | 22 | 8.14593 | 44 | 6.38976 |
| 1 | 0.35675 | 23 | 8.06924 | 45 | 6.15963 |
| 2 | 0.59145 | 24 | 7.78458 | 46 | 5.82247 |
| 3 | 1.02421 | 25 | 7.15265 | 47 | 5.41843 |
| 4 | 1.76643 | 26 | 6.44610 | 48 | 4.98783 |
| 5 | 2.45950 | 27 | 5.97778 | 49 | 4.50606 |
| 6 | 2.97905 | 28 | 5.63530 | 50 | 4.05856 |
| 7 | 3.46447 | 29 | 5.27806 | 51 | 3.78350 |
| 8 | 4.30512 | 30 | 4.81668 | 52 | 3.74228 |
| 9 | 5.26163 | 31 | 4.14179 | 53 | 4.15449 |
| 10 | 5.78634 | 32 | 3.46774 | 54 | 5.00983 |
| 11 | 6.07644 | 33 | 3.08316 | 55 | 5.34813 |
| 12 | 6.23928 | 34 | 2.88663 | 56 | 5.39878 |
| 13 | 6.33414 | 35 | 2.84806 | 57 | 5.22764 |
| 14 | 6.27698 | 36 | 3.03808 | 58 | 4.60923 |
| 15 | 6.11553 | 37 | 3.51615 | 59 | 3.77745 |
| 16 | 5.97524 | 38 | 4.17024 | 60 | 3.46904 |
| 17 | 5.92432 | 39 | 4.54980 | 61 | 3.39766 |
| 18 | 6.05341 | 40 | 4.92638 | 62 | 3.41174 |
| 19 | 6.40250 | 41 | 5.62633 | 63 | 3.59185. |
| 20 | 7.41097 | 42 | 6.27292 |   |   |
| 21 | 8.03059 | 43 | 6.49224 |   |   |

10. The diffractive optical element according to claim 1, wherein a width of one of said plurality of phase gratings is divided equally into 64 coordinates and wherein each of said plurality of phase gratings is formed such that said phase differences and said 64 coordinates have a relationship indicated in a table below, and wherein said diffractive optical element divides said incident beam into 16 divided beams;

| Coord. | Phase | Coord. | Phase | Coord. | Phase |
|---|---|---|---|---|---|
| 0 | 0.00000 | 22 | 10.41512 | 44 | 11.31028 |
| 1 | 0.02139 | 23 | 10.45448 | 45 | 11.04914 |

-continued

| Coord. | Phase | Coord. | Phase | Coord. | Phase |
|---|---|---|---|---|---|
| 2 | 0.24455 | 24 | 10.66319 | 46 | 10.70588 |
| 3 | 0.63197 | 25 | 11.05519 | 47 | 10.49409 |
| 4 | 1.25970 | 26 | 11.52474 | 48 | 10.31520 |
| 5 | 1.93395 | 27 | 11.90449 | 49 | 10.09816 |
| 6 | 2.45426 | 28 | 12.17922 | 50 | 9.41989 |
| 7 | 2.94875 | 29 | 12.38914 | 51 | 8.18725 |
| 8 | 3.67947 | 30 | 12.57125 | 52 | 7.75399 |
| 9 | 4.63407 | 31 | 12.71915 | 53 | 7.51219 |
| 10 | 5.28644 | 32 | 12.78723 | 54 | 7.14200 |
| 11 | 5.75541 | 33 | 12.73151 | 55 | 6.22557 |
| 12 | 6.29385 | 34 | 12.67358 | 56 | 5.34703 |
| 13 | 7.22466 | 35 | 12.59483 | 57 | 4.96071 |
| 14 | 8.10410 | 36 | 12.48228 | 58 | 4.61458 |
| 15 | 8.59831 | 37 | 12.25170 | 59 | 4.07851 |
| 16 | 8.96738 | 38 | 11.83332 | 60 | 3.42295 |
| 17 | 9.36434 | 39 | 11.38850 | 61 | 3.06471 |
| 18 | 9.85078 | 40 | 11.15996 | 62 | 2.90472 |
| 19 | 10.26310 | 41 | 11.13878 | 63 | 2.69100. |
| 20 | 10.46203 | 42 | 11.22934 | | |
| 21 | 10.45751 | 43 | 11.33304 | | |

11. The diffractive optical element according to claim 1,
wherein a width of one of said plurality of phase gratings is divided equally into 64 coordinates and
wherein each of said plurality of phase gratings is formed such that said phase differences and said 64 coordinates have a relationship indicated in a table below, and
wherein said diffractive optical element divides said incident beam into 16 divided beams;

| Coord. | Phase | Coord. | Phase | Coord. | Phase |
|---|---|---|---|---|---|
| 0 | 1.88359 | 22 | 6.11453 | 44 | 0.00000 |
| 1 | 2.20660 | 23 | 5.47716 | 45 | 0.11027 |
| 2 | 2.55505 | 24 | 4.92379 | 46 | 0.55334 |
| 3 | 2.96194 | 25 | 4.32768 | 47 | 1.03784 |
| 4 | 3.50884 | 26 | 3.82595 | 48 | 1.31994 |
| 5 | 4.12613 | 27 | 3.35523 | 49 | 1.57085 |
| 6 | 4.76767 | 28 | 2.90596 | 50 | 1.87626 |
| 7 | 5.47822 | 29 | 2.32512 | 51 | 2.43060 |
| 8 | 6.13673 | 30 | 1.74405 | 52 | 3.02974 |
| 9 | 6.68710 | 31 | 1.41813 | 53 | 3.35112 |
| 10 | 7.20112 | 32 | 1.33906 | 54 | 3.36775 |
| 11 | 7.89495 | 33 | 1.50709 | 55 | 3.30493 |
| 12 | 9.04040 | 34 | 1.88758 | 56 | 3.22809 |
| 13 | 9.57330 | 35 | 2.18736 | 57 | 3.38151 |
| 14 | 9.71868 | 36 | 2.27226 | 58 | 3.63778 |
| 15 | 9.62977 | 37 | 2.04002 | 59 | 3.99318 |
| 16 | 9.28356 | 38 | 1.53403 | 60 | 4.32386 |
| 17 | 8.61084 | 39 | 1.01003 | 61 | 4.56700 |
| 18 | 8.05756 | 40 | 0.69457 | 62 | 4.81525 |
| 19 | 7.66091 | 41 | 0.47837 | 63 | 5.24823. |
| 20 | 7.25906 | 42 | 0.31341 | | |
| 21 | 6.74087 | 43 | 0.09924 | | |

12. The diffractive optical element according to claim 1,
wherein a width of one of said plurality of phase gratings is divided equally into 64 coordinates and
wherein each of said plurality of phase gratings is formed such that said phase differences and said 64 coordinates have a relationship indicated in a table below, and
wherein said diffractive optical element divides said incident beam into 16 divided beams;

| Coord. | Phase | Coord. | Phase | Coord. | Phase |
|---|---|---|---|---|---|
| 0 | 5.72434 | 22 | 3.36629 | 44 | 2.81337 |
| 1 | 5.63396 | 23 | 3.48561 | 45 | 3.34012 |
| 2 | 5.50930 | 24 | 3.42313 | 46 | 3.80482 |
| 3 | 5.27261 | 25 | 3.12300 | 47 | 4.35758 |
| 4 | 4.B8795 | 26 | 2.69584 | 48 | 4.96980 |
| 5 | 4.30602 | 27 | 2.35180 | 49 | 5.69287 |
| 6 | 3.64948 | 28 | 1.99120 | 50 | 6.46242 |
| 7 | 3.08115 | 29 | 1.63443 | 51 | 7.23784 |
| 8 | 2.55867 | 30 | 1.17193 | 52 | 7.81849 |
| 9 | 1.97143 | 31 | 0.85687 | 53 | 8.30500 |
| 10 | 1.34005 | 32 | 0.75565 | 54 | 8.79971 |
| 11 | 0.79516 | 33 | 0.92786 | 55 | 9.44981 |
| 12 | 0.40111 | 34 | 1.14320 | 56 | 9.93265 |
| 13 | 0.10653 | 35 | 1.34150 | 57 | 10.15751 |
| 14 | 0.00000 | 36 | 1.34215 | 58 | 10.06035 |
| 15 | 0.05143 | 37 | 1.13101 | 59 | 9.80890 |
| 16 | 0.39145 | 38 | 0.74260 | 60 | 9.48861 |
| 17 | 0.97952 | 39 | 0.50082 | 61 | 9.27769 |
| 18 | 1.48361 | 40 | 0.45241 | 62 | 9.11678 |
| 19 | 1.93317 | 41 | 0.64103 | 63 | 8.98587. |
| 20 | 2.36975 | 42 | 1.08511 | | |
| 21 | 2.92970 | 43 | 2.01522 | | |

13. The diffractive optical element according to claim 1,
wherein a width of one of said plurality of phase gratings is divided equally into 64 coordinates and
wherein each of said plurality of phase gratings is formed such that said phase differences and said 64 coordinates nave a relationship indicated in a table below, and
wherein said diffractive optical element divides said incident beam into 16 divided beams;

| Coord. | Phase | Coord. | Phase | Coord. | Phase |
|---|---|---|---|---|---|
| 0 | 1.54498 | 22 | 5.12490 | 44 | 4.58932 |
| 1 | 1.53807 | 23 | 5.76799 | 45 | 4.08540 |
| 2 | 1.47715 | 24 | 6.51557 | 46 | 3.64850 |
| 3 | 1.24424 | 25 | 7.20367 | 47 | 3.38558 |
| 4 | 0.73233 | 26 | 7.74924 | 48 | 3.32567 |
| 5 | 0.22242 | 27 | 8.19234 | 49 | 3.45876 |
| 6 | 0.00000 | 28 | 8.70042 | 50 | 3.70385 |
| 7 | 0.04708 | 29 | 9.36852 | 51 | 3.91694 |
| 8 | 0.38968 | 30 | 9.97109 | 52 | 3.97602 |
| 9 | 1.19776 | 31 | 10.29019 | 53 | 3.83511 |
| 10 | 1.79235 | 32 | 10.33327 | 54 | 3.20469 |
| 11 | 1.98643 | 33 | 10.09636 | 55 | 2.54279 |
| 12 | 1.97353 | 34 | 9.53795 | 56 | 2.38836 |
| 13 | 1.83361 | 35 | 8.96804 | 57 | 2.49146 |
| 14 | 1.66370 | 36 | 8.57712 | 58 | 2.85804 |
| 15 | 1.65178 | 37 | 8.20621 | 59 | 3.52314 |
| 16 | 1.84488 | 38 | 7.75680 | 60 | 4.08221 |
| 17 | 2.25997 | 39 | 7.15388 | 61 | 4.39631 |
| 18 | 2.82905 | 40 | 6.55447 | 62 | 4.55539 |
| 19 | 3.44314 | 41 | 6.03255 | 63 | 4.60899. |
| 20 | 4.01223 | 42 | 5.55515 | | |
| 21 | 4.55932 | 43 | 5.07323 | | |

\* \* \* \* \*

UNITED STATES PATENT AND TRADEMARK OFFICE
CERTIFICATE OF CORRECTION

PATENT NO.  : 6,021,000
DATED       : February 1, 2000
INVENTOR(S) : T. IIZUKA et al It is certified that error appears in the above-identified patent and that said Letters Patent is hereby corrected as shown below:

At column 18, line 20 (claim 8, line 32) of the printed patent, the following two lines were omitted from the table and should be inserted at the end thereof:
---20    7.68791      42    9.43005
   21    8.41221      43    8.81092---

At column 18, line 28 (claim 9, line 6) of the printed patent, "Save" should be ---have---.

At column 18, line 38 (claim 9, line 16) of the printed patent, "6.44610" should be ---6.44611---

At column 20, line 8 (claim 12, line 16) of the printed patent, "4.B8795" should be ---4.88795---.

On the cover of the printed patent, at Item [75], Inventors, "Tsutomu Sato" should be deleted.

On the cover of the printed patent, at Item [56], References Cited, Foreign Patent Documents, "61-2138021" should be ---61-213802---

UNITED STATES PATENT AND TRADEMARK OFFICE
CERTIFICATE OF CORRECTION

PATENT NO. : 6,021,000
DATED : February 1, 2000
INVENTOR(S) : T. IIZUKA et al

It is certified that error appears in the above-identified patent and that said Letters Patent is hereby corrected as shown below:

At column 14, line 52 (claim 1, line 15) of the printed patent, delete "of" (second occurrence).

Signed and Sealed this

Twenty-fourth Day of April, 2001

Attest:

NICHOLAS P. GODICI

Attesting Officer

Acting Director of the United States Patent and Trademark Office